(12) United States Patent
Lipscomb et al.

(10) Patent No.: US 9,491,926 B2
(45) Date of Patent: Nov. 15, 2016

(54) METHOD OF MAKING EXTRUDED SELF-CLUMPING GRANULAR ABSORBENT

(71) Applicant: Pioneer Pet Products, LLC, Cedarburg, WI (US)

(72) Inventors: John M. Lipscomb, Cedarburg, WI (US); Scott Repinski, Franklin, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 14/426,483

(22) PCT Filed: Sep. 11, 2013

(86) PCT No.: PCT/US2013/059325
§ 371 (c)(1),
(2) Date: Mar. 6, 2015

(87) PCT Pub. No.: WO2014/043284
PCT Pub. Date: Mar. 20, 2014

(65) Prior Publication Data
US 2015/0238931 A1   Aug. 27, 2015

Related U.S. Application Data

(63) Continuation of application No. 13/842,534, filed on Mar. 15, 2013, now Pat. No. 9,266,088, and a continuation of application No. 13/868,073, filed on Apr. 22, 2013, now Pat. No. 9,266,089, and a continuation of application No. 13/868,084, filed on Apr. 22, 2013, now Pat. No. 9,266,090.

(60) Provisional application No. 61/699,858, filed on Sep. 11, 2012, provisional application No. 61/775,707, filed on Mar. 11, 2013.

(51) Int. Cl.
| *B01J 20/24* | (2006.01) |
| *A01K 1/015* | (2006.01) |
| *A01K 1/01* | (2006.01) |
| *B01J 20/12* | (2006.01) |
| *B01J 20/30* | (2006.01) |
| *B01J 20/32* | (2006.01) |
| *B29C 37/00* | (2006.01) |
| *B29C 47/00* | (2006.01) |
| *B29K 1/00* | (2006.01) |
| *B29L 31/00* | (2006.01) |

(52) U.S. Cl.
CPC ........... *A01K 1/0155* (2013.01); *A01K 1/0107* (2013.01); *A01K 1/0154* (2013.01); *B01J 20/12* (2013.01); *B01J 20/24* (2013.01); *B01J 20/3007* (2013.01); *B01J 20/3042* (2013.01); *B01J 20/3212* (2013.01); *B01J 20/3236* (2013.01); *B29C 37/0025* (2013.01); *B29C 47/0004* (2013.01); *B29C 47/0016* (2013.01); *B29C 47/0066* (2013.01); *A01K 1/0152* (2013.01); *B29K 2001/00* (2013.01); *B29K 2003/00* (2013.01); *B29K 2995/0068* (2013.01); *B29L 2031/769* (2013.01)

(58) Field of Classification Search
CPC .................................. B01J 20/24; B01J 20/00
USPC ........................................................ 502/404
See application file for complete search history.

(56) References Cited

U.S. PATENT DOCUMENTS

| 3,316,590 A | 5/1967 | Rettig |
| 3,672,945 A | 6/1972 | Taylor |
| 4,822,546 A | 4/1989 | Lohkamp |
| 5,638,770 A | 6/1997 | Peleties |
| 5,735,232 A | 4/1998 | Lang et al. |
| 5,806,462 A | 9/1998 | Parr |

(Continued)

FOREIGN PATENT DOCUMENTS

| DE | 4424946 | 1/1996 |
| FR | 2794993 | 12/2000 |

(Continued)

OTHER PUBLICATIONS

Stryapkov A. V. et al. "Ekologicheski bezopasnykh" (initially cited in Applicant's submitted Search Report).*

(Continued)

*Primary Examiner* — Edward Johnson
(74) *Attorney, Agent, or Firm* — Boyle Fredrickson S.C.

(57) ABSTRACT

A granular absorbent and granular absorbent making method producing granular absorbent from a carbohydrate starch-containing cereal grain, e.g., corn, based admixture extruded from a single screw or twin screw extruder forming liquid absorbing pellets having a clumping agent formed during extrusion composed at least in part of carbohydrate polymer binder. Each pellet is extruded under conditions that cause formation of carbohydrate polymer binder clumping agent at least some of which is water soluble. One preferred method of extruding granular absorbent causes starch dextrinization to occur such that at least some of the carbohydrate polymer binder clumping agent in each liquid absorbing pellet of the granular absorbent is formed of dextrin. Each pellet can be coated such as with a smectite that preferably is bentonite. During use, clumping agent formed during extrusion of a pellet dissolves and flows in between and along adjacent pellets when the pellet(s) is/are wetted causes the pellets to "self-clump" without the presence of any clumping agent additive producing a granular absorbent that not only performs well but which is faster and easier to clean up as a result of its "self-clumping" formulation.

42 Claims, No Drawings

(56) References Cited

U.S. PATENT DOCUMENTS

| | | | |
|---|---|---|---|
| 5,942,170 A | 8/1999 | Peitz | |
| 6,220,206 B1* | 4/2001 | Sotillo | A01K 1/0155 119/171 |
| 6,720,406 B1 | 4/2004 | Elsner et al. | |
| 2003/0065296 A1 | 4/2003 | Kaiser et al. | |
| 2004/0112298 A1 | 6/2004 | Buttersnack et al. | |
| 2004/0244710 A1 | 12/2004 | Tsengas et al. | |
| 2005/0005869 A1 | 1/2005 | Fritter et al. | |
| 2007/0017453 A1 | 1/2007 | Fritter et al. | |
| 2007/0175403 A1 | 8/2007 | Wang et al. | |
| 2007/0289543 A1 | 12/2007 | Petska et al. | |
| 2008/0223302 A1* | 9/2008 | Wang | A01K 1/0155 119/173 |
| 2009/0000562 A1 | 1/2009 | Jenkins et al. | |
| 2010/0269758 A1 | 10/2010 | Fuchshuber | |
| 2011/0185977 A1 | 8/2011 | Dixon et al. | |
| 2011/0253055 A1 | 10/2011 | Tang et al. | |
| 2011/0287123 A1 | 11/2011 | Feichtinger et al. | |
| 2012/0152115 A1 | 6/2012 | Gerds et al. | |
| 2013/0213313 A1 | 8/2013 | Wang et al. | |
| 2013/0213314 A1 | 8/2013 | Wang et al. | |

FOREIGN PATENT DOCUMENTS

| | | |
|---|---|---|
| JP | H03290126 | 12/1991 |
| RU | 2153251 | 7/2000 |
| RU | 2273129 | 4/2006 |
| WO | 8403513 | 9/1984 |
| WO | 2011094022 | 8/2011 |
| WO | 2011134074 | 11/2011 |

OTHER PUBLICATIONS

Stryapkov et al. Ekstruzionnaya obrabotka kak faktor polucheniya "ekologicheski bezopasnykh" produktov iz zerna i ego proizvodnykh. Vestnik OGU 2'2004, pp. 171-174.

Written Opinion mailed Mar. 24, 2016 issued in PCT/US2015/062233.

ISR and Written Opinion mailed Dec. 30, 2013 issued in PCT/US2013/059284.

ISR and Written Opinion mailed Dec. 19, 2013 issued in PCT/US2013/059325.

ISR and Written Opinion mailed Jun. 4, 2015 issued in PCT/US2015/012869.

International Preliminary Report on Patentability mailed Apr. 22, 2016 issued in PCT/US2015/012969.

ISR and Written Opinion mailed May 4, 2015 issued in PCT/US2015/012969.

Extended EP Search Report mailed Apr. 22, 2016 issued in EP App. No. 13837242.0.

Extended EP Search Report mailed Jun. 3, 2016 Issued in EP App. No. 13837783.3.

ISR and Written Opinion mailed Jun. 18, 2015 issued in PCT/US2015/020167.

ISR and Written Opinion mailed Aug. 6, 2015 issued in PCT/US2015/020310.

Patent Examination Report No. 1 mailed May 4, 2016 issued in AU 2013315516.

* cited by examiner

METHOD OF MAKING EXTRUDED SELF-CLUMPING GRANULAR ABSORBENT

FIELD

The present invention is directed to an absorptive material and more particularly to a method of making granular extruded absorptive material having a clumping agent produced during extrusion and an extruded absorptive material having a clumping agent produced during extrusion that is self-clumping when absorbing liquid making cleanup faster and easier when finished absorbing the liquid.

BACKGROUND

While attempts have been made in the past to produce a lighter, more natural, and even biodegradable absorptive material capable of absorbing a wide variety of liquids including environmentally hazardous liquids, such as oil, diesel fuel, gasoline, other petroleum distillates, and the like, inert liquids, such as water, and other types of liquids, such as paint, solvents, coatings, and the like, improvements nonetheless remain desirable. Conventional clay-based and gel-based absorbents are relatively heavy, cost a considerable amount of money to ship, and are often a burden for purchasers to carry. While many so-called natural absorbents have been introduced into the marketplace, they can be nearly as heavy as conventional clay or mineral based absorbents, typically absorb far less liquid than conventional absorbents, can produce their own unpleasant odor, and many times are difficult to gather when cleaning up after the absorbent has been used to clean up a spill.

SUMMARY

The present invention is directed to an absorbent formed of liquid absorbing grains or granules formed of extruded starch-containing liquid absorbent pellets that each have a plurality of pairs of internal voids that aid liquid absorption and which have an outer surface that can be porous providing a plurality of liquid absorbing pores with each absorbent pellet including a water soluble carbohydrate polymer binder formed during extrusion that functions as a clumping agent to clump adjacent pellets together when wetted with liquid. The pellets produce a granular absorbent having a bulk density at least 40% less than the bulk density of conventional clay-based and mineral-based absorbents that weigh no more than half the weight of conventional clay-based and mineral-based absorbents for a given volume. The absorbent pellets of the present invention have a starch content of at least 40% by weight such that the combination of pores, voids and starch grains present in each absorbent pellet work synergistically together to produce a lightweight absorbent that has an absorptive capacity for absorbing liquid, including environmentally hazardous liquids, liquid and liquefied toxic waste, paints, coatings, strippers, thinners, and the like that is substantially as great as conventional clay-based and mineral-based granular absorbents on a per weight basis. A preferred absorbent formed of absorbent self-clumping pellets of the present invention possesses at least 70% the absorptive capacity of conventional clay-based and mineral-based granular absorbents on a per volume basis.

Each absorbent pellet has a clumping agent produced during gelatinization and/or extrusion of a high-carbohydrate admixture containing at least 45% carbohydrates by weight where at least some of the starch present is converted during gelatinization and/or extrusion during processing in a single screw or twin screw extruder into a clumping agent in the form of a carbohydrate polymer binder that can include or be composed of water soluble dextrin. In a preferred absorbent pellet embodiment, each pellet is formed of a high-starch admixture containing at least 45% starch by weight that produces such a carbohydrate polymer binder clumping agent during extrusion that preferably is water soluble enabling at least some binder to dissolve in the liquid being absorbed by the pelletized absorbent of the invention wetting absorbent pellets and flowing along the pellets in between one or more adjacent pellets at least loosely binding the adjacent pellets clumping them together. Such self-clumping liquid absorbent pellets not only efficiently absorb a wide variety of liquids, including wastes, environmentally contaminating liquid, and toxic liquids, such as discussed above, but the liquid absorbed by the pellets wets them during absorption distributing carbohydrate polymer binder throughout the pellets causing them to self-clump together during absorption making clean up of the used or spent absorbent pellets quick and easy.

Each pellet is round or oblong and can be generally cylindrical formed of natural or plant based constituents producing liquid absorbent pellets of biodegradable composition. Each pellet can be formed to have a width or diameter ranging between 1 millimeter and 10 millimeters and a length of between 1 millimeter and 10 millimeters enabling a plurality of pairs of rows and columns of absorbent pellets a plurality of pairs of layers deep to be applied on any surfaced containing or otherwise contaminated with a liquid sought to be removed by a user of the absorbent pellets of the invention.

Each absorbent pellet can include a treatment added, mixed or otherwise blended with the admixture in the form of one or more of an odor inhibitor, a urea degradation inhibitor, a urease formation inhibitor, a bacterial inhibitor, a fungal growth inhibitor, a yeast growth inhibitor, an anti-parasitic treatment, an antiviral, a scent, a fragrance, or another treatment before extrusion. Each pellet can be treated after extrusion with one or more of such treatments including by dusting, misting, spraying, agglomerating, plating, coating and/or otherwise applying one or more such treatments to the pellets.

If desired, each absorbent pellet can be coated with a coating that increases pellet crush strength, increases absorption, and which can impart each pellet with an appearance, texture and feel similar to or substantially the same as conventional clay-based or mineral-based absorbent granules. Such a coating can form a shell around each pellet possessing hardness greater than that of the pellet with the coating substantially completely encapsulating each pellet. Such a coating can also be configured to complement the pellet by giving the pellet one or more improved or optimal absorptive, odor control, antibacterial, antifungal, anti-yeast, antiviral, anti-parasitic and/or other properties not already present in the pellet itself. In a preferred embodiment, the coating includes or is formed of an absorbent material, such as a smectite that can be a bentonite clay, such as sodium bentonite, and which can include zeolite, sodium bicarbonate and/or calcium bicarbonate, along with silica, e.g., crystalline silica, if desired applied in a manner that coats each pellet with a coating that is between 0.05 millimeter and 1 millimeter thick and preferably at least 0.1 millimeter thick. Such a coating can have at least 70% by coating weight of smectite coating each pellet with a coating that is between 0.05 millimeter and 1 millimeter thick and preferably at least 0.1 millimeter thick.

The pellets are made from a carbohydrate and starch containing admixture having a relatively low moisture content of less than 15% by weight, and preferably less than 11% by weight, when gelatinized and extruded by a single screw or twin screw extruder under a pressure and temperature high enough to form a carbohydrate polymer binder in each extruded absorbent pellet that causes the pellet to self-clump with other pellets when wetted by a liquid being absorbed by the pellets. In one preferred absorbent pellet embodiment, a relatively high carbohydrate high starch admixture is gelatinized and extruded by a single screw or twin screw extruder at an extruder pressure of at least 800 pounds per square inch (psi) and at an extruder temperature of at least 135° Celsius (about 275° Fahrenheit) forming carbohydrate polymer binder clumping agent in each extruded pellet that facilitates self-clumping of pellets wetted by liquid being absorbed by the pellets. In a preferred method of making absorbent pellets in accordance with the invention, the admixture is gelatinized and extruded at a pressure of at least 900 psi, preferably between 900-1200 psi, and at a temperature of at least 140° Celsius (about 284° Fahrenheit), preferably between 140° Celsius (about 284° Fahrenheit) and 165° Celsius (about 330° Fahrenheit).

When extruded under such conditions, starch carbohydrate polymer binder formation can and preferably does occur forming absorbent pellets having at least 1% by weight of a water soluble carbohydrate polymer binder clumping agent that preferably is or includes dextrin. Under such extrusion conditions and extruder operating parameters starch dextrinization can and preferably does occur, such as due to adiabatic extrusion conditions, forming dextrin in each pellet greater than 0.1% of pellet weight that functions as a clumping agent that facilitate pellet self-clumping during absorbent use. In a preferred method, extrusion under such conditions produces between 1% and 10% carbohydrate polymer binder clumping agent that can be partially or substantially completely composed of dextrin.

A preferred admixture that produces extruded absorbent self-clumping pellets is formed of at least 50% by dry mixture weight of a high carbohydrate cereal grain having a carbohydrate content of at least 45% of cereal grain weight that also is of high starch content having a starch content of at least 45%. Suitable cereal grains include one or more of corn or maize, rice, wheat, triticale, amaranth, and/or sorghum with each cereal grain being particle size reduced or comminuted, e.g., ground to form grit, meal, starch, and/or flour. The admixture can include cellulosic material in an amount of no more than 50% of dry admixture weight having a cellulose content of at least 20% by cellulosic material weight. In at least one admixture, no cellulosic material is used with at least 80% of the dry admixture formed of one or more particle size reduced or comminuted cereal grains mixed or blended together in a mixer or blender to which water can be added, such as to activate one or more of the cereal grains and/or constituent(s) of the grains including one or more of starch(es), sugar(s), protein(s), and/or the like. Water can also be added to the admixture in the extruder, including during gelatinization of the admixture by the extruder, if desired.

The gelatinized admixture is extruded from the extruder at pressures and temperatures discussed herein forming carbohydrate polymer binder clumping agent in each extruded absorbent pellet extruding them at a rate of at least a plurality of pairs of pairs, i.e., at least three, of pellets per second and/or at a rate of at least 150–200 pounds per hour. A suitable extruder particularly well suited for producing such absorbent pellets at such a desired minimum pound per hour rate that also possess desired absorbent pellet consistency and uniformity is a single screw extruder that can be equipped, if desired, with a compression screw or a screw having one or more compressor sections or zones that can help keep extrusion pressures and temperatures substantially constant during extruder operation.

Such extruder operating conditions and parameters not only form absorbent pellets containing carbohydrate polymer binder clumping agent but they also can cause each pellet to expand or puff like puffed rice or popcorn during and after extrusion decreasing pellet density. Depending on factors including admixture moisture content, extrusion screw speed, extrusion die aperture size(s) and number(s), as well as desired pellet density, a post-extrusion pellet expansion or puffing control step can be performed after extrusion, including immediately after extrusion, which can limit post-extrusion expansion or puffing which can also positively impact starch re-crystallization and/or retrogradation. Where such a post-extrusion pellet expansion or puffing control step is performed, pellets exiting the extruder are held, preferably in a container or the like, allowing between 5 pound and 50 pounds of extruded pellets to be gathered together in contact with one another for a period of between 5 minutes and 45 minutes before the expansion or puffing stabilized pellets are transferred.

The pellets can be treated or coated right after extrusion, including after post-extrusion expansion or puffing stabilization where such a step is desired or needed.

Where the pellets are treated after extrusion, the treatment can be applied to the pellets before and/or during a coating step where each pellet is plated, agglomerated, or otherwise coated with a coating that can be like or include the smectite, e.g., bentonite, coating discussed above. Where a post-extrusion treatment step is performed, one or more of an odor inhibitor, a urea degradation inhibitor, a urease formation inhibitor, a bacterial inhibitor, a fungal growth inhibitor, a yeast growth inhibitor, an anti-parasitic treatment, an antiviral, a scent, a fragrance, or another treatment can be applied directly to the pellets, such as by dusting, misting, spraying, coating or the like, to treat the pellets. Such a post-extrusion treatment step can be performed while the pellets are in an agglomerator, coating tumbler, spice tumbler, or the like that can agitate, displace, shake and/or move pellets relative to one another during application of the one or more treatments.

Where treatment is performed as part of the coating step, one or more treatments can be mixed, entrained, and/or dissolved in a liquid that can also contain one or more constituents of the coating and/or which can be used to wet, tackify, or otherwise increase coating adherence during the coating step. The coating step is performed in one or more agglomerators, plating devices, and/or coating tumblers until the absorbent pellets are desirably coated.

If desired, one or more drying steps can be performed after extrusion and/or after coating to dry the coated absorbent pellets. One or more pellet stabilization steps can also be performed, where uncoated and/or coated pellets are held at a desired temperature and/or humidity for a desired period of time. In one preferred stabilization step, pellets extruded fall into a container where the pellets are held in contact with one another for either a predetermined period of time or time range or until the pellets cool to a predetermined temperature or until their temperature is within a predetermined temperature range before the pellets are transferred for additional post-extrusion processing, like treatment, coating, drying and/or packaging.

The absorbent pellets, whether coated or uncoated, are packaged for shipment and retail sale in bags, containers, boxes, or the like that can be air-tightly sealed along with one or more packets of a desiccant where it is desired to maintain the packaged pellets at or below a desired moisture level during shipment, storage and prior to actual absorbent use. If desired, one or more packets of a humectant can be packaged with the absorbent pellets in addition to or instead of desiccant packets where it is desired to maintain the packaged pellets at or above a desired moisture level during shipment, storage and prior to use. Such packets help maintain pellet absorbency and performance for an extended period of time and can help extend shelf life by slowing or stopping starch re-crystallization and/or retrogradation.

In one preferred method of making a granular absorbent using an admixture that includes starch is gelatinized in an extruder under sufficient pressure and temperature causing an absorbent pellet clumping agent to form that includes a carbohydrate polymer binder formed of at least some of the starch in the admixture during extrusion from the extruder producing a plurality of extruded absorbent pellets having a bulk density no greater than 0.7 grams per cubic centimeter having carbohydrate polymer binder clumping agent that is soluble in a plurality of the types of liquids being absorbed by the absorbent pellets. Such liquids that can cause absorbent pellet self-clumping during absorption of the liquid by the pellets including water-based liquids, petroleum based liquids, liquefied toxic waste, liquid toxic waste, paint, paint thinner(s), chemical stripper(s), liquid plating agents, as well as other types of liquids such absorbents are typically used to pick up and dispose. In one preferred method, at least part, if not all, of the carbohydrate polymer binder clumping agent of each absorbent pellet includes or is formed of dextrin.

During operation of an extruder in carrying out such a method of making absorbent, the admixture (after any water has been added) has a moisture content low enough and the extruder operates at an extrusion pressure and temperature high enough to dextrinize starch in the admixture during at least one of gelatinization and extrusion by the extruder forming dextrin in each absorbent pellet. In one preferred implementation of the method, the admixture (after any water has been added, i.e. wet admixture) has a moisture content of no more than 18% by total wet admixture weight and the extruder extrudes the plurality of absorbent pellets at an extrusion pressure of at least 800 pounds per square inch and at extrusion temperature of at least 135° Celsius. Under such extruder operating conditions, the extruder can and preferably does operate under adiabatic extruder operating conditions.

One such method of making a liquid absorbent in accordance with the present invention produces absorbent pellets each having at least 0.1% dextrin by weight. Another such method produces absorbent pellets each having at least 2% dextrin by weight. Still another such method produces absorbent pellets each having between 0.1% and 5% dextrin by weight. Another such method produces absorbent pellets each having between 2% and 10% dextrin by weight.

One preferred admixture well suited for use with a method of making a granular or particulate absorbent in accordance with the present invention uses at least one cereal grain having a relatively high carbohydrate content of at least 45% by cereal grain weight. Such an admixture can be formed of at least 70% by dry admixture weight of at least one cereal grain having a high carbohydrate content of at least 45% by cereal grain weight. When extruded in accordance with a method of making granular absorbent of the present invention, each one of the plurality of absorbent pellets produced has at least 1% of carbohydrate polymer clumping agent by uncoated pellet weight and preferably between 1% and 10% carbohydrate polymer clumping agent. At least some of the carbohydrate polymer clumping agent of each such absorbent pellet can be and preferably is water soluble.

One such preferred admixture (after any water has been added, i.e. wet admixture) has a moisture content of no more than about 10% by total wet admixture weight and the extruder extrudes the plurality of pellets at an extrusion pressure of at least 600 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) made from one or more suitable sources of corn that include corn grits, corn meal, corn flour and/or corn starch. Such an admixture can be formed of a blend or mixture of more than one of corn grits, corn meal, corn flour and/or corn starch. As previously discussed, each absorbent pellet can be coated after extrusion with a smectite-containing coating that can be formed of bentonite if desired.

Another preferred admixture (after any water has been added, i.e. wet admixture) producing extruded pellets having between 1% and 10% carbohydrate polymer binder clumping agent by pellet weight has a moisture content of no more than about 18% by total wet admixture weight and the extruder extrudes the plurality of pellets at an extrusion pressure of at least 800 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. If desired, each pellet can be coated after extrusion with a smectite-containing coating that can be formed of bentonite.

Another preferred admixture (after any water has been added, i.e. wet admixture) used to extrude absorbent pellets having between 1% and 10% carbohydrate polymer binder clumping agent by pellet weight has a moisture content of no more than about 15% by total wet admixture weight with the extruder extruding the plurality of pellets at an extrusion pressure of at least 900 pounds per square inch and at extrusion temperature of at least 140° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. If desired, each pellet can be coated after extrusion with a smectite-containing coating that can be formed of bentonite.

In a preferred method of making granular absorbent in accordance with the present invention, the extruder extrudes pellets having at least 1% of the carbohydrate polymer binder clumping agent by pellet weight at an extrusion pressure of between 900 pounds per square inch and 1,200 pounds per square inch at an extrusion temperature of between 140° Celsius and 165° Celsius. Such a method produces self-clumping absorbent pellets with at least some of the carbohydrate polymer binder clumping agent being water soluble. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. If desired, each absorbent pellet can be coated after extrusion with a smectite-containing coating that can be formed of bentonite.

In another preferred method of making self-clumping granular absorbent in accordance with the present invention, the extruder extrudes pellets at an extrusion pressure of between 900 pounds per square inch and 1,200 pounds per square inch and at an extrusion temperature of between 140° Celsius and 165° Celsius producing absorbent pellets each having at least some carbohydrate polymer binder clumping agent with at least some of the carbohydrate polymer binder clumping agent being water soluble and which can be formed of water soluble dextrin. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. If desired, each absorbent pellet can include a smectite-containing coating that can be formed of bentonite.

In another preferred method of making absorbent, the extruder extrudes pellets at an extrusion pressure of between 900 pounds per square inch and 1,200 pounds per square inch and at an extrusion temperature of between 140° Celsius and 165° Celsius causing starch dextrinization to occur during one of gelatinizing and extruding of the pellets forming at least some dextrin in each extruded pellet. The admixture can be made of a dry admixture formed of at least 70% by dry admixture weight of at least one cereal grain having a high carbohydrate content of at least 65% by cereal grain weight and having a high starch content of at least 60% by cereal grain weight. Suitable sources of the cereal grain include at least of corn grits, corn meal, corn flour and corn starch and which can include a blend or mixture of more than one of corn grits, corn meal, corn flour and corn starch. One such method of making absorbent produces extruded absorbent pellets each having at least 0.1% dextrin by weight. Another such method produces pellets each having at least 2% dextrin by weight. Still another such method produces pellets each having between 0.1% and 5% dextrin by weight. Another such method produces pellets each having between 2% and 10% dextrin by weight. If desired, each such absorbent pellet can have a smectite-containing coating that can be formed of bentonite.

These and other objects, features and advantages of this invention will become apparent from the following detailed description of the invention and appended claims.

DETAILED DESCRIPTION

Absorbent Pellet Embodiments

The present invention is directed to a method of making a starch based granular absorbent by extrusion and high starch absorbent granules or pellets (hereinafter "pellets") produced by extrusion that are well suited for use as absorbent. The highly liquid absorptive pellets can be used by themselves as an absorbent but can be subjected to one or more treatment steps after extrusion if desired. The absorbent pellets are extruded using a high-carbohydrate admixture having at least 45% carbohydrates by weight and a relatively low moisture content of less than 15% by weight producing pellets each having an outer surface containing carbohydrate polymer binder that reacts to liquid being absorbed by the pellets by dissolving and flowing between adjacent pellets causing self-clumping of the pellets during absorption. In one preferred post-extrusion pellet treatment, a water-absorptive coating that preferably includes a smectite, such as bentonite, is applied after extrusion where such a coating is desired. Such a treatment can also include the application of a propionate, preferably sodium propionate, if desired.

Such an admixture preferably also is high in starch content having at least having at least 45% starch by weight. Such a starch admixture can also possess a relatively low moisture content of less than 12% by weight. Such a high starch admixture produces absorbent pellets each having carbohydrate polymer binder with at least part of the outer surface of each pellet having at least some of the carbohydrate binder that reacts to liquid being absorbed by the pellets during absorbent use by dissolving and promoting pellet clumping by at least lightly adhesively bonding adjacent pellets together. In one preferred post-extrusion pellet treatment, a water-absorptive coating that preferably includes a smectite, such as bentonite, is applied after extrusion.

Pellets having such a composition and made using a method in accordance with the present invention advantageously are self-clumping when used as an absorbent to absorb a wide variety of liquids and self-clump without the use of an added clumping agent, such as guar gum, as the carbohydrate polymer binder produced from starch in the admixture during extrusion functions as a clumping agent to self-clump the absorbent pellets during use. The pellets are advantageously highly water absorptive or hydrophilic as the pellets relatively rapidly absorb moisture from urine, fecal matter, vomit, blood, and other biological liquids. After liquid absorption, the pellets are also water expulsive in that water that was previously absorbed by the pellets later wicks to the outer surface of the pellets where it evaporates. Starch along with any fiber present in each pellet advantageously functions as a biological filter adsorbing organic material, such as urea, such that water evaporation from a clump of used pellets draws and keeps water away from the liquid organic material, e.g., urea, adsorbed by the pellet. Where urea is adsorbed by pellets during liquid absorption, subsequent water evaporation from the clumped spent pellets helps slow, block or halt the urea cycle while also advantageously preventing bacterial, fungal, yeast and viral growth.

The absorbent pellets can be generally circular or oval and can be oblong, e.g., generally cylindrical, if desired. Each pellet has an outer surface or skin that can be porous having a plurality of pairs of pores of a plurality of different sizes formed therein. Each pellet also has a plurality of pairs of internal voids, one or more of which can be in communication with one or more of the pores helping to facilitate liquid absorption during use. At least a portion of the skin includes or is formed of a carbohydrate polymer binder that dissolves or solubilizes when the pellet is wetted by oil, water, or another liquid. The liquid solubilized binder flows with the liquid being absorbed by the pellets in between adjacent pellets mixing together with liquid solubilized binder from one or more adjacent wetted pellets causing the pellets to clump. As evaporation occurs, the carbohydrate polymer binder between the adjacent pellets strengthens the bond between adjacent pellets more firmly clumping the pellets together enabling the clump of pellets to be collectively removed together from unbound or unused pellets, such as by sweeping, scooping, sifting, straining or the like.

When used for absorbing liquids, each pellet can be round, e.g., generally oval, or oblong, e.g., generally cylindrical, having a width or diameter of between two millimeters and ten millimeters and a length no greater than about fifteen millimeters. In one preferred embodiment, a batch of pellets produced in accordance with the present invention that is well suited for use as an absorbent, such as cat litter, has at least one half of the pellets of the batch having diameters or widths ranging from about two millimeters to about four millimeters with lengths ranging from about two millimeters to about four millimeters. In another preferred embodiment, a batch of pellets produced in accordance with the present invention that is well suited for use as a liquid absorbent, including cat litter, has at least one half of the pellets of the batch having diameters or widths ranging from about four millimeters to about six millimeters with lengths ranging from about five millimeters to about ten millimeters. Where used as cat or pet litter, such sized pellets are desirable for helping to prevent a pet or animal using a litter box filled with such absorbent pellets from tracking pellets out of the litter box during usage.

Each absorbent pellet is of high-starch composition having at least 45% starch by weight and preferably being composed of at least 55% starch by weight having an amount by weight of carbohydrate polymer binder produced during gelatinization by the extruder, including during extrusion from the extruder, sufficient to solubilize and self-clump with adjacent pellets upon being wetted with water, urine or another liquid. In a preferred embodiment, each pellet has at least 1% carbohydrate polymer binder and preferably at least about 2% carbohydrate polymer binder by weight that can be and preferably is relatively uniformly distributed throughout the pellet with at least some of the carbohydrate polymer binder disposed at or along the outer surface of the pellet and which can form at least a portion of the outer pellet surface. In one such preferred embodiment, each pellet has between 2% and 10% carbohydrate polymer binder by weight with at least some of the carbohydrate polymer binder disposed at or along the outer surface of each pellet enabling it to be dissolved by water, urine or another liquid to form a flowable liquid adhesive that flows from the pellet therealong and in between adjacent pellets to bind them and hence clump them together.

In another preferred embodiment, each absorbent pellet has at least 3% carbohydrate polymer binder by weight that can be distributed throughout the pellet but which has at least some carbohydrate polymer binder disposed at or along the outer surface of the pellet and which can form at least a portion of the outer pellet surface. In one such preferred embodiment, each pellet has between 3% and 10% carbohydrate polymer binder by weight with at least some of the carbohydrate polymer binder disposed at or along the outer surface of each pellet enabling it to be dissolved by water, urine or another liquid to form a flowable liquid adhesive that flows from the pellet along the outer pellet surface as well as in between adjacent pellets to bind them and hence clump them together.

In still another preferred embodiment, each pellet has at least 4% carbohydrate polymer binder by weight that can be distributed throughout the pellet but which has at least some carbohydrate polymer binder disposed at or along the outer surface of the pellet and which can form at least a portion of the outer pellet surface. In one such preferred embodiment, each pellet has between 4% and 12% carbohydrate polymer binder by weight with at least some of the carbohydrate polymer binder disposed at or along the outer surface of each pellet enabling it to be dissolved by water, urine or another liquid during absorbent use to form a flowable liquid adhesive that flows from the pellet along the outer pellet surface as well as in between adjacent pellets to bind them and hence clump them together.

In a further preferred embodiment, each pellet has at least 5% carbohydrate polymer binder by weight that can be distributed throughout the pellet which has at least some carbohydrate polymer binder disposed at or along the outer surface of the pellet and which can form at least a portion of the outer pellet surface. In one such preferred embodiment, each pellet has between 5% and 15% carbohydrate polymer binder by weight with at least some of the carbohydrate polymer binder disposed at or along the outer surface of each pellet, including forming at least a portion of the outer pellet surface, enabling it to be dissolved by water, urine or another liquid to form a flowable liquid adhesive that flows from the pellet along the outer pellet surface including in between adjacent pellets to bind them and hence clump them together.

In a preferred absorbent pellet embodiment, the carbohydrate polymer binder is formed of starch, which preferably is or includes an amylopectin starch based carbohydrate polymer binder, at least some of which is disposed at or along the outer pellet surface such that the carbohydrate polymer binder can form or otherwise define at least a portion of the outer pellet surface. Such a pellet can have such an amylopectin starch based carbohydrate polymer binder in any of the minimum weight percentages and/or weight percentage ranges defined herein, including as above.

In another preferred pellet embodiment, the carbohydrate polymer binder can be formed of starch, such as an amylopectin starch based carbohydrate polymer binder, but includes dextrin, preferably in the form of yellow dextrin and/or white dextrin, at least some of which is disposed at or along the outer pellet surface such that the carbohydrate polymer binder can form or otherwise define at least a portion of the outer pellet surface. Such a pellet can have such a dextrin containing carbohydrate polymer binder in any of the minimum weight percentages and/or weight percentage ranges defined above.

In still another preferred pellet embodiment, the carbohydrate polymer binder is formed substantially of dextrin, preferably in the form of yellow dextrin and/or white dextrin, at least some of which is disposed at or along the outer pellet surface such that the dextrin binder can form or otherwise define at least a portion of the outer pellet surface. Such a pellet can have such dextrin binder in any of the minimum weight percentages and/or weight percentage ranges discussed below.

Each such dextrin binder containing absorbent pellet is of high-starch composition having at least 45% starch by weight and preferably being composed of at least 55% starch by weight having an amount by weight of dextrin produced during gelatinization by the extruder, including during extrusion from the extruder, sufficient to dissolve, flow in between adjacent pellets, and self-clump with adjacent pellets upon being wetted with water, urine or another liquid during absorbent use. In a preferred embodiment, each pellet has at least 0.1% dextrin and preferably at least about 2% dextrin by weight that can be and preferably is relatively uniformly distributed throughout the pellet with at least some of the dextrin disposed at or along the outer surface of the pellet forming at least a portion of the outer pellet surface. In one such preferred embodiment, each pellet has between 0.1% and 5% dextrin by weight with at least some of the dextrin disposed at or along the outer surface of each pellet enabling the dextrin to be dissolved by water, urine or another liquid to form a flowable liquid adhesive that flows from the pellet therealong and in between adjacent pellets to bind them and hence clump them together thereby producing a self-clumping biodegradable granular absorbent that is also well suited for use as pet or animal litter, e.g., cat litter. In another such preferred embodiment, each pellet has between 2% and 10% dextrin by weight with at least some of the dextrin disposed at or along the outer surface of each pellet enabling the dextrin to be dissolved by water, urine or another liquid to form a flowable liquid adhesive that flows from the pellet therealong and in between adjacent pellets to bind them and hence clump them together thereby producing self-clumping biodegradable granular absorbent. Where used as pet or animal litter formed of extruded absorbent pellets produced in accordance with the present invention, the spent pellets are preferably not only biodegradable after absorbent use but also can be toilet flushable.

In another preferred embodiment, each liquid absorbent pellet has at least 3% dextrin by weight that can be distributed throughout the pellet but which has at least some of the dextrin disposed at or along the outer surface of the pellet such that at least a portion of the outer pellet surface can be and preferably is formed of dextrin. In one such preferred embodiment, each pellet has between 3% and 10% dextrin by weight with at least some of the dextrin disposed at or along the outer surface of each pellet enabling it to be dissolved by water, urine or another liquid to form a flowable liquid adhesive that flows from the pellet along the outer pellet surface including in between adjacent pellets to bind them and hence clump them together thereby producing a self-clumping biodegradable granular absorbent that also is well suited for use as pet or animal litter, e.g. cat litter.

In still another preferred embodiment, each pellet has at least 4% dextrin by weight that can be distributed throughout the pellet but which has at least some dextrin disposed at or along the outer surface of the pellet and which can form at least a portion of the outer pellet surface. In one such preferred embodiment, each pellet has between 4% and 12% dextrin by weight with at least some of the dextrin disposed at or along the outer surface of each pellet enabling the dextrin to be dissolved by water, urine or another liquid to form a flowable liquid adhesive that flows from the pellet along the outer pellet surface including in between adjacent pellets to bind them and hence "self-clump" them together.

In a further preferred embodiment, each pellet has at least 5% dextrin by weight that can be distributed throughout the pellet which has at least some dextrin disposed at or along the outer surface of the pellet and which can form at least a portion of the outer pellet surface. In one such preferred embodiment, each pellet has between 5% and 15% dextrin by weight with at least some of the dextrin disposed at or along the outer surface of each pellet, including forming at least a portion of the outer pellet surface, enabling the dextrin to be dissolved by water, urine or another liquid to form a flowable liquid adhesive that flows from the pellet along the outer pellet surface including in between adjacent pellets to bind them and hence clump them together. Such a pellet embodiment produces granular absorbent well suited for use as pet or animal litter that is formed of at least a plurality of pairs, i.e., at least three, of the pellets that is not only biodegradable but which also is self-clumping without requiring any separate additive to promote clumping.

A plurality of pairs of such pellets produces granular absorbent well suited for use as cat litter having a bulk density of no greater than 0.65 grams per cubic centimeter ($g/cm^3$) and preferably no greater than about 0.62 grams per cubic centimeter ($g/cm^3$) which has a bulk density of at least 40% less than conventional clay-based (e.g., bentonite containing) cat litters having a bulk density of no less than 1 gram per cubic centimeter ($g/cm^3$) that is at least 50% lighter in weight and preferably at least 60% lighter in weight for a given volume as compared to conventional clay-based (e.g., bentonite containing) cat litters making containers of litter produced of coated pellets in accordance with the present invention. Such granular absorbent produces cat litter that is much easier for a person to carry as compared to a container of the same size filled with conventional clay-based litter. Granular absorbent capable of use as pet or animal litter composed of such absorbent pellets (whether the pellets are coated or uncoated) have pellets (when uncoated or not yet coated) possessing a weight per liter of at least 200 grams per liter and preferably at least 250 grams per liter helping to produce a granular pelletized litter formed of pellets (whether coated or uncoated) having a desired pellet density and consistency that not only minimizes tracking but which also absorbs liquid and clumps similar to and preferably better than conventional clay-based (e.g., bentonite containing) absorbents including conventional clay-based cat litters. In another preferred granular absorbent capable of use as pet or litter formed of such pellets (whether coated or uncoated), the uncoated pellets have a weight per liter of at least 275 grams per liter.

Pellet Coatings and Pellet Coating Methods

Each absorbent pellet constructed in accordance with the present invention can be coated with a coating covering the outer surface of each pellet with the coating formulated to enhance pellet performance including by increasing the ability of each pellet to absorb or facilitate absorption of water, urine, or another liquid as well as to treat material, including fecal matter, urine, other biological material, water or another liquid absorbed by the pellets. In a preferred embodiment, any one of the above described pellet embodiments are coated with a coating that includes a smectite. One preferred smectite is a type of clay that preferably is a bentonite, e.g. preferably sodium bentonite. Such a coating can also include sodium bicarbonate, e.g. baking soda, a zeolite, and a scent if desired. Such a coating can also include silica, such as crystalline silica, as well as calcium carbonate if desired.

In a preferred coated pellet embodiment, any one of the plurality of pairs of uncoated pellets embodiments can be coated with such a coating after extrusion. In one preferred implementation of a method of making coated granular absorbent in accordance with the present invention that can also be used as cat litter, the pellets are coated relatively shortly after extrusion and before any drying of the pellets is done. In another preferred implementation of a method of making coated granular absorbent in accordance with the present invention, the extruded absorbent pellets are coated more than an hour after extrusion as the pellets can be coated after the pellets are dried including at a location remote from where the pellets where extruded if desired.

One preferred coating formulation includes at least 65% by coating weight of smectite that preferably is sodium bentonite that is ground or crushed into a powder having an average mesh size of about 20 mesh or greater (i.e., 30 mesh, 50 mesh, or finer mesh), preferably having a mesh size of 50 mesh or greater (i.e., 70 mesh, 100 mesh, or finer mesh), and which has an average particle size no greater than about 400 microns. Such a powdered coating includes no more than 10% by coating weight of either sodium bicarbonate or calcium bicarbonate. Where the powdered coating includes zeolite, the powdered coating includes no more than 10% by coating weight of zeolite. Such a powdered coating formulation can contain silica, e.g., crystalline silica, but not more than about 8% by coating weight. Where the powdered coating includes a scent or a fragrance, such a powdered coating includes no more than 3% and preferably less than about 1% by coating weight of a scent or fragrance.

One preferred coating formulation includes at least 80% by coating weight of smectite that preferably is sodium bentonite that is ground or crushed into a powder having an average mesh size of about 50 mesh or greater and which has an average particle size no greater than about 400 microns. Such a powdered coating includes no more than 10% by coating weight of either sodium bicarbonate or calcium bicarbonate. Where the powdered coating includes zeolite, the powdered coating includes no more than 8% by coating weight of zeolite. Such a powdered coating formulation can contain silica, e.g., crystalline silica, but not more than about 8% by coating weight. Where the powdered coating includes a scent or a fragrance, such a powdered coating includes no more than 2% and preferably less than about 1% by coating weight of a scent or fragrance. Such a coating is not limited to just these constituents as other constituents can be used. The amount of coating applied to each absorbent pellet preferably amounts to no more than 5% pellet weight once the coating has dried or cured.

Such a coating formulation can be applied as a powder to absorbent pellets that can be and preferably are uncoated, mixed with a liquid, such as water, which is sprayed on the pellets, or otherwise applied to uncoated pellets in a manner that coats them. Such a coating formulation can be applied using an agglomerator, such as a commercially available agglomerator, and/or using a coating tumbler, such as a commercially available coating tumbler or the like.

In one preferred method of applying such a coating formulation, such as one of the above-described coating formulations, the coating formulation is applied in powdered form onto uncoated pellets in a commercial agglomerator or a commercial coating tumbler that rotates, tumbles, vibrates and/or otherwise agitates pellets therein within a short enough period of time after extrusion of the pellets that the outer surface of the pellets are still sticky or tacky facilitating adherence of the powdered coating formulation to each pellet. In one such preferred method of applying the coating, the coating formulation is applied onto uncoated pellets within an hour of being extruded and while at least some of the carbohydrate polymer binder on or of the outer surface of each pellet is still sticky or tacky thereby using the clump facilitating binder in each pellet produced during extrusion to facilitate adherence of the powdered coating formulation to each pellet. In another such preferred method of applying the coating, the coating formulation is applied onto uncoated pellets within a half hour of being extruded and while at least some of the carbohydrate polymer binder on or of the outer surface of each pellet is still sticky or tacky thereby using the clump facilitating binder in each pellet produced during extrusion to facilitate adherence of the powdered coating formulation to each pellet. In still another such preferred method of applying the coating, the coating formulation is applied onto uncoated pellets within fifteen minutes of being extruded and while at least some of the carbohydrate polymer binder on or of the outer surface of each pellet is still sticky or tacky thereby using the clump facilitating binder in each pellet produced during extrusion to facilitate adherence of the powdered coating formulation to each pellet.

In one preferred method of applying such a coating formulation, the coating formulation is applied using a liquid, such as water, and a pressurized gas, such as pressurized air, which not only helps vaporize or mist the coating formulation containing liquid but also helps agitate or move around the pellets in a drum, container or enclosure which are being coated. In such a preferred method of applying a coating formulation onto pellets that can be uncoated, such as right after being extruded, a ground or powdered coating formulation, such as one of the above-described formulations, is mixed with liquid, e.g., water, which can be sprayed from a nozzle together with compressed air into an enclosure, such as a drum or other container, which contains pellets helping to agitate the pellets and coat the pellets with a minimum of disturbance or damage to the pellets during coating. The drum or container in which the pellets are disposed during such a coating step preferably is rotated, vibrated or otherwise agitated to help facilitate coating each pellet.

In a preferred coating arrangement, the liquid with which the ground or powdered coating formulation is mixed provides a liquid carrier for the ground or powdered coating formulation that can and preferably does include one or more antimicrobial agents, antifungal agents, and/or anti-yeast agents in the liquid that are at least partially absorbed into each pellet to treat each pellet during the coating step and/or at least form part of the outer coating of each pellet thereby treating the coating and/or pellet during the coating step. Such a liquid coating formulation carrier can include one or more inhibitors in the liquid that can be one or more urine breakdown inhibitors(s), such as one or more urease inhibitor(s) and/or one or more de-nitrification inhibitors. Such a liquid coating formulation carrier can also include a citrate, such as sodium citrate, and/or an acid, such as citric acid, and/or propionic or propanoic acid that can be at least partially absorbed by each pellet during the coating step treating each pellet and/or form at least part of the coating that covers each pellet during the coating step. Such treatments added to the liquid that serves as a carrier in which ground or powdered coating formulation is mixed and applied, e.g., sprayed, onto the pellets during the coating step treats each pellet and/or the coating applied to each pellet during the coating step in a manner that inhibits odor, inhibits bacterial growth, inhibits fungal growth, inhibits viral growth, and/or inhibits yeast growth.

If desired, one or more of these treatments can be applied in a step separate from that of the coating step where each pellet is coated with a ground or powdered coating formulation in accordance with that discussed above. One or more of these treatments can be applied in a treatment step performed before the coating step where it is desired for at least some of the treatment(s) applied to the pellets to be at least partially absorbed into each pellet or coat the outer surface of each pellet before coating each pellet with the powdered or ground coating formulation. It is also contemplated performing the coating step before performing a treatment step such as where it is also desired to treat the coating. Finally, a method of making granular absorbent formed of liquid absorbing pellets in accordance with the present invention contemplates performing one or more pellet treatment steps before performing one or more pellet coating steps further contemplating performing one or more treatment steps after the coating step(s) is/are performed.

One example of a suitable urine breakdown inhibitor treatment that can be applied during a treatment and/or coating step is Dicyandiamide (DCD), which is also known as Cyanoguanidine, 1-Cyanoguanidine, or 2-Cyanoguanidine, can be included as an additive, e.g. additive 40, 42, 44, and/or 46, or as a coating 48. If desired, a member of a cyanamide derivate, such as Guanidine hydrochloride, Chlorohexidine, Biguanide, 3-Amino-1,2,4-trazole, Aminoguanidine, Tetramethyl guanidine, Benzoguanamine, 1-o-Tolylbiguanide, Cyanodithioimidocarbonic acid, 2-Aminopyrimidine, Dodecyl guanidine, Guanidine, Disodium cyanodithioimidocarbonate, Cyanamide, Butylbiguanide, Guanidinium sulfate, 2-Amino-4-methoxy-6methyl-1,3,5-trazine, Pimagedine hydrochloride, Phenylguanidine, Guanylthiourea, Cyprex, O-Methylisourea, Aminoguanidine bicarbonate, 3-Amino-5-carboxy-1,2,4-triazole, Chlorhexidine hydrochloride, 5-Amono-1H-tetrazole, 1-o-Tolyl-biguanide monohydrochloride, N-Cyanoacetoimidate, Dodecylguanidine hydrochloride, Carbazamidine hydrochloride, 3-Amino-5-mercapto-1,2,4-triazole, Cyanoimidocarbonic acid dimethylester, 2-Amino-4,6-dimethoxy-pyrimidine, Guanidine sulfamate, Bis(2-methylisouronium) sulfate, and/or 2-Methylisouronium acetate, can be used with or instead of DCD. DCD or one of the aforementioned equivalents can function as a urease inhibitor that inhibits the action of the urease enzyme to prevent urease from breaking down urea in urine absorbed by pellets of granular absorbent containing DCD (and/or an equivalent). It should be noted that DCD also is a de-nitrification inhibitor that prevents lighter vapor pressure ammoniated products from being released from the degradation or breakdown of urea byproducts and/or the degradation or breakdown of other components in urine deposited in pellets of the granular absorbent containing such an inhibitor.

Another example of a suitable urine breakdown inhibitor that can also be applied during a treatment and/or coating step is hydroquinone (HQ) as it is a urease inhibitor that inhibits the action of the urease enzyme in breaking down urea in urine. Hydroquinone is also known as benzene-1,4-diol or quinol. As a result of inhibiting the action of urease, HQ prevents the breakdown of urea in urine in absorbent, e.g., litter, formed of extruded absorbent pellets produced in accordance with the present invention by preventing the formation of lighter vapor pressure ammoniated product from exiting pellets that have absorbed animal or human urine. If desired, other hydroquinones or hydroquinone equivalents can be used with or instead of HQ. It is contemplated that HQ (or another hydroquinone) used with DCD. One or more hydroquinones can be included in a treatment/coating wetting mixture that includes DCD and/or one or more derivatives of DCD, including one or more of those listed in the preceding paragraph.

A still further example of a suitable urine breakdown inhibitor treatment that can also be applied during a treatment and/or coating step is N-(n-butyl) thiophosphoric triamide (NBPT) as it also is a urease inhibitor that inhibits the action of the urease enzyme in breaking down urea in urine. If desired, one or more NBPT equivalents can be used with or instead of NBPT. It is contemplated that HQ can be part of a granular absorbent formulation formed of absorbent pellets that also includes DCD and/or another hydroquinone. In another absorbent formulation, NBPT (or an equivalent(s)) can be applied to treat absorbents pellets with such a treatment also including DCD and/or one or more derivatives of DCD, including one or more of those listed above, if desired. In a still further absorbent composition, NBPT (or an equivalent(s)) can be applied to treat the pellets. If desired, the treatment can also include DCD and/or one or more derivatives of DCD along with one or more hydroquinones.

Another treatment that can be applied is a propionate, such as sodium propionate, which can be added as a pellet stabilizer that can stabilize and/or prevent re-crystallization and/or retrogradation of starch in each pellet.

Where a coating formulation, such as disclosed above, is applied to the pellets, the application of the coating formulation is done in such a manner, such as using an agglomerator, a coating tumbler or the like, to coat each pellet with a coating having a thickness of at least 50 microns. In a preferred method of coating the pellets, an agglomerator or coating tumbler is used to apply a coating formulation, such as one of the above-described coating formulations, to coat each pellet with a coating having a thickness of at least 50 microns that can vary between 50 microns (e.g., 0.05 millimeter) and about 1000 microns (e.g., 1 millimeter) that substantially completely covers substantially the entire outer surface of each pellet being coated. In another preferred method of coating the pellets, an agglomerator or coating tumbler is used to apply a coating formulation, such as one of the above-described coating formulations, to coat each pellet with a coating having a thickness of at least 100 microns that can vary between 100 microns (e.g., 0.1 millimeter) and about 1000 microns (e.g., 1 millimeter) that substantially completely covers substantially the entire outer surface of each pellet being coated.

When the coating dries or sets after the coating step has been performed, the coating helps strengthen each absorbent pellet helping to impart to each coated pellet a crush strength that is at least 75% that of conventional clay-based and mineral-based absorbents, such as clay-based cat litters, having a bulk density at least 80% greater than coated pellets produced in accordance with the present invention. In one preferred coated pellet embodiment, such a coating imparts a crush strength that is at least 85% that of conventional absorbents having a bulk density nearly twice as great and, in at least some instances more than twice as great, as the bulk density of coated pellets produced in accordance with the present invention.

In another preferred coated pellet embodiment, a plurality of pairs of coated pellets coated with a bentonite-containing coating, such as described above, having a coating thickness between 0.1 millimeters and 1 millimeters produces coated pellets having a bulk density of no greater than 0.7 grams per cubic centimeter ($g/cm^3$) and preferably no greater than about 0.65 grams per cubic centimeter ($g/cm^3$) which has a bulk density of at least 35% less than conventional clay-based (e.g., bentonite containing) and mineral-based absorbents, including conventional cat litters, having a bulk density of no lower than 1 gram per cubic centimeter ($g/cm^3$). One preferred coated pellet embodiment is coated with such a bentonite containing coating has a bulk density of no greater than 0.65 grams per cubic centimeter ($g/cm^3$) and preferably no greater than about 0.62 grams per cubic centimeter ($g/cm^3$) which has a bulk density of at least 40% less than conventional clay-based (e.g., bentonite based) and mineral-based absorbents having a bulk density of about 1.1 grams per cubic centimeter (g/cm³). Absorbents produced with such coated pellets are therefore at least 40% lighter in weight and preferably at least about 50% lighter in weight for a given volume as compared to conventional clay-based (e.g., bentonite containing) and mineral-based absorbents making containers of granular absorbent produced of coated pellets in accordance with the present invention much easier for a person to carry as compared to a container of the same size filled with conventional absorbent.

When the coating dries or sets after the coating step has been performed, the coating substantially completely covers substantially the entire outer surface of each pellet being coated helping to encapsulate each pellet helping to produce a coated pellet having desirable liquid waste absorption and clumping characteristics. Such a coating substantially encapsulating each pellet forms a hard shell that appears and feels much like conventional granular absorbents. Where used as a pet or animal litter, such coating produces coated pellets having a hard shell that appears and feels much like conventional clay-based cat litter to an animal, e.g., cat, stepping on and/or in litter formed of a plurality of the coated pellets as if the animal were stepping on and/or in conventional clay-based cat litter.

When the coating dries or sets after the coating step has been performed, the coating substantially completely covers substantially the entire outer surface of each pellet being coated helping to encapsulate each pellet helping to produce a coated pellet having desirable liquid waste absorption and clumping characteristics. Such a coating substantially encapsulating each pellet also helps retain any treatment(s) applied to the pellets or at least slow the rate at which such treatments may possibly evaporate, degrade or otherwise reduce in effectiveness. Such a coating substantially encapsulating each pellet also allows greater concentrations of such treatments to be applied including concentrations that normally would be considered toxic to humans and animals because the coating serves as a barrier preventing the human or animal using the granular absorbent from coming into contact with such higher concentrations.

Such a coating substantially encapsulating each pellet also allows treatments normally considered toxic to humans and animals to be applied because the coating serves as a barrier preventing human and animal contact with such potentially toxic treatments. Examples of such treatments that are potentially toxic that can be applied to the pellets in a treatment step performed before the coating step include phenols, glycols, triclosan, certain chlorides, e.g., benzyl chloride, hypochlorite or sodium hypochlorite, e.g. chlorine, ethylene oxide, methyl bromide, peroxycetic acid, pyrethins and pyrethroids, organophosphates, carbamates, organochlorides, anti-parasitic treatments, and/or other potentially toxic chemicals and compounds. The coating subsequently applied to each treated pellet advantageously helps prevent the potentially toxic chemical(s) and compound(s) in each treated pellet from coming into contact with humans and animals including during liquid absorption by the coated absorbent pellets. Through the use of such a coating enabling safe use of such a potentially toxic treatment or treatments applied to pellets produced in accordance with the present invention sealed by the coating, the resultant absorbent better inhibits bacterial growth, better inhibits fungal growth, and/or better inhibits yeast growth thereby also advantageously helping to provide better odor control.

A preferred anti-parasitic treatment capable of inhibiting and/or killing *toxoplasma gondii* protozoa is formed of artemisinin in a ground, powdered, or other comminuted form and/or in a form that can be solubilized or dissolved in a liquid, such as water, to treat each pellet before and/or during pellet coating producing a treated pellet having at least 0.25% by pellet weight and preferably between 0.25% and 5% by pellet weight. Another preferred anti-parasitic treatment is cetylpyridinium chloride applied in a concentration or amount of at least 0.25% by pellet weight and preferably between 0.25% and 3% by pellet weight. Still another preferred anti-parasitic treatment is natural or synthetic pyrethroids in a concentration of at least 0.25% by pellet weight and preferably between 0.25% and 5% by pellet weight. Other anti-parasitic treatments that inhibit and/or kill *toxoplasma gondii* protozoa include cyhalothrin, bifenthrin, carbaryl or another carbamate, Imidacloprid or another neonicotinoid, fipronil or another GABA receptor pesticide, permethrin, diazinon, dichorvos, DDT (dichlorodiphenyltrichloroethane) or another organophosphate insecticide, and/or chlorfenapyr or another pro-insecticide in an amount sufficient to inhibit and preferably kill *toxoplasma gondii* protozoa in feline fecal material deposited in granular absorbent formed of pellets formulated and produced in accordance with the present invention used as pet or animal litter. One or more of such anti-parasitic treatments can be added to the admixture during making of the admixture, added to water added to the admixture, added to the extruder during gelatinization and/or extrusion, applied to the pellets after extrusion, included as part of any pellet coating mixture, and/or applied before, during and/or after coating the pellets.

Absorbent Pellet Making Methods

Introduction

A preferred method of making a pellet in accordance with the present invention does so using a single screw or twin screw extruder that gelatinizes a starch-containing admixture having a sufficient amount and type(s) of starch that produces a carbohydrate polymer binder and distributes at least some of the binder in and along an outer surface of a pellet extruded from the extruder. In a preferred implementation of the method, the starch-containing admixture possesses relatively low moisture and has a sufficient amount of starch of a desired amylose:amylopectin ratio or within a desired amylose:amylopectin range that causes starch dextrinization to occur during extrusion using a single screw or twin screw extruder producing a plurality of pairs of extruded absorbent pellets that each have a sufficient amount of dextrin that enables the pellets to self-clump when wetted by liquid.

Absorbent Pellet Admixture Formulation

A preferred starch-containing admixture is formed substantially of one or more high carbohydrate, high starch cereal grains to produce an admixture having a carbohydrate content of at least 60% by weight and a starch content of at least 45% by weight when the weight of any water present in each cereal grain used in the admixture is discounted or eliminated from consideration. Another preferred starch-containing admixture formed substantially of one or more high carbohydrate, high starch cereal grains has a carbohydrate content of at least 65% by weight and a starch content of at least 55% by weight when the weight of any water present in each cereal grain of the admixture is discounted or eliminated from consideration.

Suitable high carbohydrate, high starch cereal grains include one or more of corn or maize, rice, wheat, triticale, amaranth, and/or sorghum. Each cereal grain used to make an admixture in accordance with the present invention preferably is comminuted, e.g., ground, in a manner that produces reduced size cereal grain particles in the form of grits, meal, starch, or flour that is mixed in an admixture mixing step to make the admixture. Each cereal grain used to make such an admixture can be comminuted in a separate comminuting step but preferably is purchased in a form where each cereal grain used to make the admixture already has been comminuted.

Examples of suitable commercially available comminuted high carbohydrate, high starch grain cereals include corn grits, cornmeal, corn starch, corn flour, rice grits, rice meal, rice starch, rice flour, wheat grits, wheat meal, wheat starch, wheat flour, triticale grits, triticale meal, triticale starch, triticale flour, amaranth grits, amaranth meal, amaranth starch, amaranth flour, sorghum grits, sorghum meal, sorghum starch and/or sorghum flour. Such suitable high carbohydrate, high starch grain cereals can be whole or degermed. Such suitable high carbohydrate, high starch grain cereals can also be starch modified, such as chemically modified, such as by chemically cross-linking in a manner producing chemically cross-linked starches.

In one preferred admixture, each of the one or more suitable high carbohydrate high starch containing cereal grains used to form an admixture in accordance with the present invention preferably has starch with an amylose content of no more than 50% of the starch present in each one of the one or more high carbohydrate, high starch grain cereals used to make the admixture. In another preferred admixture, the starch of each one of the the one or more high carbohydrate high starch containing cereal grains used to form an admixture in accordance with the present invention preferably has an amylose:amylopectin ratio of between 10:90 and 45:55. In still another preferred admixture, the starch of the one or more high carbohydrate high starch containing cereal grains used to make the admixture has an amylose:amylopectin ratio of between 15:85 and 40:60. In a further preferred admixture, the starch of each one of the one or more high carbohydrate high starch containing cereal grains used to make the admixture has an amylose:amylopectin ratio of between 20:80 and 35:65.

In one preferred admixture, the starch of each of the one or more suitable high carbohydrate high starch containing cereal grains used to form an admixture in accordance with the present invention includes both amylose and amylopectin where the amylopectin has a weight average molecular weight ranging between 25 million g/mol. and 650 million g/mol. In such a preferred admixture, the starch of each of the one or more suitable high carbohydrate high starch containing cereal grains used to form an admixture in accordance with the present invention preferably gels during gelatinization substantially without producing any paste during gelatinization. In such a preferred admixture, the starch of each of the one or more suitable high carbohydrate high starch containing cereal grains used to form an admixture in accordance with the present invention has a short gel texture. In such a preferred admixture, the starch of each of the one or more suitable high carbohydrate high starch containing cereal grains used to form an admixture in accordance with the present invention has a starch grain size or diameter of no greater than 40 microns. In such a preferred admixture, the starch of each of the one or more suitable high carbohydrate high starch containing cereal grains used to form an admixture in accordance with the present invention is unimodal made up of spherical or polyhedral shaped starch granules without having substantially any lenticular shaped starch granules.

One preferred starch-containing admixture is formed of a mixture of one of more high carbohydrate, high starch cereal grains making up between 50% and 80% of dry admixture weight before adding any water to the admixture with the mixture of one or more cereal grains having a carbohydrate content of at least 60% by cereal grain mixture weight and a starch content of at least 50% by cereal grain mixture weight. Another preferred starch-containing admixture is formed of a mixture of one of more high carbohydrate, high starch cereal grains making up between 50% and 80% by weight (before the addition of any water to the admixture) with the mixture of one or more cereal grains having a carbohydrate content of at least 65% of cereal grain mixture weight and a starch content of at least 60% of cereal grain mixture weight. A further preferred starch-containing admixture is formed of a mixture of one of more high carbohydrate, high starch cereal grains making up between 50% and 80% by (before the addition of any water to the admixture) with the mixture of one or more cereal grains having a carbohydrate content of at least 70% of cereal grain mixture weight and a starch content of at least 65% of cereal grain mixture weight.

Where less than the entire admixture is made of high carbohydrate, high starch cereal grains, a cellulosic material in an amount of at least 5% and no greater than 50% of the total admixture weight (before the addition of any water to the admixture) can be added to the admixture to provide the remainder of the admixture with the cellulosic material being added in an amount sufficient to help not only facilitate liquid absorption during absorbent use but also to help generally retain pellet structure in a manner that helps binder clumping of adjacent pellets during liquid absorption by the pellets. Suitable cellulosic material(s) include one or more of a wood fiber, hay, preferably alfalfa hay oat hay or another type of hay, beet fiber, preferably beet pulp, or another cellulosic material. Where less than the entire admixture is made of cereal grains, the remainder of the admixture can include sodium chloride in an amount of between about 0% and about 5% of the admixture weight (before the addition of any water to the admixture) can be added to the admixture to help produce or otherwise help induce formation of carbohydrate polymer binder during gelatinization and/or extrusion preferably by helping to produce or help induce dextrin formation or dextrinization. If desired, glycerol monostearate (GMS) in an amount of no more than about 1% and preferably between 0% and 0.2% by total admixture weight (before the addition of any water to the admixture) can also be added to the admixture to help produce a desired gelatinized admixture viscosity during extrusion that helps maintain generally constant extrusion temperatures and pressures during extrusion and which also can function as a surfactant that can help with the plating or coating of the pellets using any one of the coating formulations discussed above.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, or the like as well as incidental matter and/or incidental impurities.

Another preferred starch-containing admixture is formed of a mixture of one of more high carbohydrate, high starch cereal grains making up between 60% and 90% by weight of the total admixture (before the addition of any water to the admixture) with the mixture of the one or more high carbohydrate, high starch cereal grains having a carbohydrate content of at least 60% by cereal grain mixture weight and a starch content of at least 50% by cereal grain mixture weight. Still another preferred starch-containing admixture (before the addition of any water to the admixture) is formed of a mixture of one of more high carbohydrate, high starch cereal grains making up between 60% and 90% by weight of the total admixture with the mixture of the one or more high carbohydrate, high starch cereal grains having a carbohydrate content of at least 65% by cereal grain mixture weight and a starch content of at least 60% by cereal grain mixture weight. A further preferred starch-containing admixture is formed of a mixture of one of more high carbohydrate, high starch cereal grains making up between 60% and 90% by weight (before adding any water to the admixture) with the mixture of one or more cereal grains having a carbohydrate content of at least 70% of cereal grain mixture weight and a starch content of at least 65% of cereal grain mixture weight.

Where less than the entire admixture of the preceding paragraph is made of high carbohydrate, high starch cereal grains, the remainder of the admixture can include a cellulosic material in an amount of at least 5% and no greater than 40% of admixture weight (before the addition of any water to the admixture). The remainder of the admixture can further include sodium chloride in an amount of between 0.1% and 5% of the admixture weight (before the addition of any water to the admixture) can be added to the admixture. If desired, glycerol monostearate in an amount of no more than about 0.2% by total admixture weight (before the addition of any water to the admixture) can also be added to the admixture.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities.

Another preferred starch-containing admixture is formed of a mixture of one of more of high carbohydrate, high starch cereal grains that make up between 80% and 95% by weight of the total admixture (before the addition of any water to the admixture) with the mixture of one or more cereal grains having a carbohydrate content of at least 60% by cereal grain mixture weight and a starch content of at least 45% by cereal grain mixture weight. Still another preferred starch-containing admixture is formed of a mixture of one of more cereal grains that make up between 80% and 95% by weight of the total admixture (before the addition of any water to the admixture) with the mixture of one or more cereal grains having a carbohydrate content of at least 65% by cereal mixture weight and a starch content of at least 55% by cereal grain mixture weight. A further preferred starch-containing admixture is formed of a mixture of one of more cereal grains that make up between 80% and 95% by weight of the total admixture (before the addition of any water to the admixture) with the mixture of one or more cereal grains having a carbohydrate content of at least 70% by cereal mixture weight and a starch content of at least 60% by cereal grain mixture weight.

Where less than the entire admixture of the preceding paragraph is made of high carbohydrate, high starch cereal grains, the remainder of the admixture can include a cellulosic material in an amount of at least 2% and no greater than 20% of admixture weight (before the addition of any water to the admixture). The remainder of the admixture can further include sodium chloride in an amount of between 0.1% and 5% of the admixture weight (before adding any water) added to the admixture. If desired, glycerol monostearate in an amount of no more than about 0.2% of total admixture weight (before adding any water) can also be added.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities.

Another preferred starch-containing admixture is formed of a mixture of one of more of high carbohydrate, high starch cereal grains that make up between 80% and 99% (2100%) by weight of the total admixture (before the addition of any water to the admixture) with the mixture of one or more cereal grains having a carbohydrate content of at least 60% by cereal grain mixture weight and a starch content of at least 45% by cereal grain mixture weight. Still another preferred starch-containing admixture is formed of a mixture of one of more cereal grains that make up between 80% and 99% (2100%) by weight of the total admixture (before the addition of any water to the admixture) with the mixture of one or more cereal grains having a carbohydrate content of at least 65% by cereal mixture weight and a starch content of at least 55% by cereal grain mixture weight. A further preferred starch-containing admixture is formed of a mixture of one of more cereal grains that make up between 80% and 99% (2100%) by weight of the total admixture (before the addition of any water to the admixture) with the mixture of one or more cereal grains having a carbohydrate content of at least 70% by cereal mixture weight and a starch content of at least 60% by cereal grain mixture weight.

Where less than the entire admixture of the preceding paragraph is made of high carbohydrate, high starch cereal grains, the remainder of the admixture can include a cellulosic material containing at least 20% cellulose by total weight of the cellulose material in an amount of at least 2% and no greater than 20% of admixture weight (before the addition of any water to the admixture). In at least one preferred admixture, the dry admixture has no more than about 5% of a cellulose material containing at least 20% cellulose by total weight of the cellulose material. In another preferred admixture, the dry admixture contains no cellulosic material. The remainder of the admixture can further include sodium chloride in an amount of between 0.1% and 5% of the admixture weight (before adding any water) added to the admixture. If desired, glycerol monostearate in an amount of no more than about 0.2% of total admixture weight (before adding any water) can also be added.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities.

Another preferred starch-containing admixture is formed of a mixture of one of more cereal grains that make up between 90% and 99% (≈100%) by weight of the total admixture (before the addition of any water to the admixture) with the mixture of one or more cereal grains having a carbohydrate content of at least 60% by cereal grain mixture weight and a starch content of at least 45% by cereal grain mixture weight. Still another preferred starch-containing admixture is formed of a mixture of one of more cereal grains that make up between 90% and 99% by weight of the total admixture (before the addition of any water to the admixture) with the mixture of one or more cereal grains having a carbohydrate content of at least 65% by cereal mixture weight and a starch content of at least 55% by cereal grain mixture weight. A further preferred starch-containing admixture is formed of a mixture of one of more cereal grains that make up between 90% and 99% by weight of the total admixture (before the addition of any water to the admixture) with the mixture of one or more cereal grains having a carbohydrate content of at least 70% by cereal mixture weight and a starch content of at least 60% by cereal grain mixture weight.

Where less than the entire admixture of the preceding paragraph is made of high carbohydrate, high starch cereal grains, the remainder of the admixture can include a cellulosic material in an amount between 0% and 10% admixture weight (before the addition of any water to the admixture). The remainder of the admixture can further include sodium chloride in an amount of between 0% and 1% of the admixture weight (before the addition of any water to the admixture) added to the admixture. If desired, glycol monostearate in an amount of between 0% and 0.2% of total admixture weight (before the addition of any water to the admixture) can also be added.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities.

An admixture formulated in accordance with the present invention, including having any of the above-disclosed admixture formulations, has a moisture or water content of at least 7% by weight and no more than 18% water by total wet admixture weight when being processed by the extruder during gelatinization and/or extrusion of the admixture. In another preferred admixture, the admixture has a moisture or water content of between about 8% and about 17% water by weight. In another preferred admixture, the admixture has a moisture or water content of between about 8.5% and about 16% water by weight. In still another preferred admixture, the admixture has a moisture or water content of between 9% and 15% by admixture weight.

Where the admixture has too much water, a water reduction step can be performed prior to or during mixing or gelatinization, such as by drying the admixture, to bring the total moisture or water content to a level within a corresponding desired one of the 7%-18%, 8%-17%, 8.5%-16% and 9%-15% water content ranges disclosed above. Where a drying step is performed, it can be performed as a separate step using a commercial dryer, an oven, using a desiccant, or the like.

Another admixture formulated in accordance with the present invention, including having any of the above-disclosed admixture formulations, has a moisture or water content of at least 7% by weight and no more than 15% water by total wet admixture weight when being processed by the extruder during gelatinization and/or extrusion of the admixture. In another preferred admixture, the admixture has a moisture or water content of between about 8% and about 14% water by weight. In another preferred admixture, the admixture has a moisture or water content of between about 8.5% and about 13% water by weight. In still another preferred admixture, the admixture has a moisture or water content of between 9% and 12% by admixture weight.

Where the admixture has too much water, a water reduction step can be performed prior to or during mixing or gelatinization, such as by drying the admixture, to bring the total moisture or water content to a level within a corresponding desired one of the 7%-15%, 8%-14%, 8.5%-13% and 9%-12% water content ranges disclosed above. Where a drying step is performed, it can be performed as a separate step using a commercial dryer, an oven, using a desiccant, or the like.

Where the admixture does not have enough water, water is added during a water adding step that can be performed in a separate water adding step, during mixing of the admixture during a mixing step, during gelatinization of the mixed admixture during a gelatinization step and/or during extrusion from the extruder during an extrusion step to increase the moisture content of the admixture so the admixture has a moisture or water content of at least 7% and no greater than 18% by total admixture weight and preferably between 7% and 15%. In another method implementation, sufficient water is added in such a water adding step that gives the admixture a moisture content of between about 8% and about 17% and preferably between 8% and 13%. In still another method implementation, sufficient water is added during the water adding step that gives the admixture a moisture content of between about 8.5% and about 16% and preferably between 8.5% and 12%. Where water is added to the admixture in a water adding step, the water can be added during the mixing step, the gelatinizing step and/or during the extrusion step just prior to pellets being extruded from the extruder.

Limiting the moisture content of the admixture so it falls within a corresponding one of the desired 7%-15%, 8%-13%, 8.5%-12% and 9%-11% water content ranges set forth above is important, if not critical, to ensuring that sufficient water soluble carbohydrate polymer binder is formed during gelatinization and/or extrusion so that each pellet extruded from the extruder contains a sufficient amount of water soluble carbohydrate polymer binder so that each pellet will advantageously clump, preferably self-clump, with one or more adjacent pellets when wetted with moisture, liquid, urine, or water. In a preferred method of making pellets in accordance with the present invention, limiting the moisture content of the admixture within a corresponding one of the above 7%-15%, 8%-13%, 8.5%-12% and. 9%-11% water content ranges is important, if not critical, to ensuring that water soluble carbohydrate polymer binder is formed during gelatinization and/or extrusion so that each pellet extruded from the extruder contains carbohydrate polymer binder disposed at, along, and/or forming at least part of the outer surface of each pellet, in an amount sufficient so that binder in each pellet will dissolve and cause the pellet to clump, preferably self-clump, with one or more adjacent pellets when at least that pellet is wetted with moisture, water, urine or another liquid.

In another preferred method of making granular absorbent in accordance with the present invention that can also be used as pet or animal litter, limiting the moisture content of the admixture within a corresponding one of the above 7%-15%, 8%-13%, 8.5%-12% and 9%-11% water content ranges is important, if not critical, to ensuring that starch dextrinization occurs during extrusion of the admixture forming a sufficient amount of dextrin in each extruded pellet that functions as a binder during liquid absorption enabling each pellet to advantageously clump, preferably self-clump, with one or more adjacent pellets when wetted with moisture, water, urine or another liquid. In one such preferred method, limiting the moisture content of the admixture within a corresponding one of the above 7%-15%, 8%-13%, 8.5%-12% and 9%-11% water content ranges is important, if not critical, to ensuring that dextrin is formed during gelatinization and/or extrusion so that each pellet extruded from the extruder contains dextrin disposed at, along, and/or forming at least part of the outer surface of each pellet, in an amount sufficient so that the dextrin dissolves in water causing each pellet to clump, preferably self-clump, with one or more adjacent pellets when the pellet is wetted with moisture, liquid, urine, or water.

Mixing the Admixture

In mixing any of the above admixture formulations, each constituent of the admixture formulation is added to a mixer or blender that preferably is a commercially available mixer or blender, such as a ribbon blender, a paddle blender, a tumble blender or a vertical blender. A preferred mixer or blender well suited for use in mixing an admixture formulated in accordance with the present invention is a commercially available ribbon blender. One suitable ribbon blender well suited for use is a Ross Model 42N-25 25 cubic feet, 10 horsepower ribbon blender. Another suitable ribbon blender well suited for use is a Ross Model 42A-52 52 cubic feet, 20 horsepower ribbon blender.

The constituents, including each high carbohydrate, high starch cereal grain, any cellulosic material(s), any sodium chloride, and any of the aforementioned additional constituents that can be added to provide the balance or remainder of the admixture are mixed in the ribbon blender for a long enough time to mix them together using suitable mixing parameters to form a substantially homogenously blended raw material mixture. Such a ribbon blender typically has a plurality of ribbons that rotate relative to one another at approximately 300 foot per minute tip speeds or higher with all of the admixture constituents blended together for at least 3 minutes before adding any water or before transferring the blended raw material mixture to a feed hopper of an extruder that feeds the blended raw material mixture into the extruder.

In a preferred method of mixing an admixture in accordance with the present invention, each high carbohydrate, high starch cereal grain of the desired admixture formulation is blended in the ribbon blender for a suitable period of time, typically at least 3 minutes, before the blended raw material mixture is transferred, such as by a bucket elevator or the like, which elevates the blended raw material mixture to feed it into the feed hopper of the extruder. Any cellulosic material, such as hay, beet pulp, wood fiber, or the like, is added to the blended raw material mixture at the feed hopper enabling a mixer, such as a paddle or ribbon mixer, driven by the extruder to mix the cellulosic material with the blended raw material mixture forming the dry admixture. Any sodium chlorite, GMO, and/or any of the aforementioned additional constituents that can be added to provide the balance or remainder of the admixture are either blended in the ribbon blender or added to the feed hopper with the cellulosic material in forming the dry admixture.

In a preferred method of making an admixture for extrusion into absorbent pellets to form granular absorbent in accordance with the present invention, water in an amount sufficient to form a wet admixture having a corresponding desired one of the 7%-15%, 8%-13%, 8.5%-12% and 9%-11% water content ranges is added to the dry admixture in the extruder. If desired, at least some of the water can be added to constituents of the admixture being blended in the ribbon blender with additional water added later to the admixture in the extruder.

Gelatinizing the Admixture and Extruding the Absorbent Pellets

The extruder is operated to gelatinize the wet admixture in the extruder gelatinizing the admixture into a dough or dough-like material that is then forced under pressure by one or more rotating screws of the extruder through the extruder until extruded from an opening in a die of an extruder head. As the gelatinized admixture is extruded as extrudate out the extruder die, a cutter, such as a rotary cutting blade rotating at a speed of between 3,000 and 9,000 revolutions per minute, cuts the extrudate exiting the extruder into at least a plurality of pairs of pellets having a diameter or width ranging between about two millimeters and about ten millimeters. Where the pellets are elongate or oblong, pellets are produced, having a length ranging between about two millimeters and about ten millimeters. The size of the die opening and the speed of the rotary cutter can be changed using routine testing and experimentation to achieve a desired pellet size producing a plurality of pairs of pellets well suited in size for use as granular absorbent. Where the granular absorbent is used as cat litter, pellets preferably are produced having a diameter or width ranging between about two millimeters and about ten millimeters and a length ranging between about two millimeters and about ten millimeters advantageously producing pellets small enough to be similar in size to conventional clay-based cat litter granules while also minimizing and preferably substantially completely preventing tracking of litter from a litter box by an animal using the litter box.

In a preferred method of making pellets well suited for use as a granular absorbent in accordance with the present invention, a preferred extruder is a single screw extruder, such as an Advantage 50 single screw extruder made by American Extrusion International of 498 Prairie Hill Road of South Beloit, Ill. In one such preferred implementation of a method of making absorbent pellets, wet admixture is gelatinized in the extruder during a gelatinization step and then extruded from the extruder during an extrusion step at a high enough extrusion temperature of at least 135° Celsius (about 275° Fahrenheit) and at a high enough extrusion pressure of at least 800 pounds per square inch (psi) at the extruder head causing carbohydrate polymer binder to form thereby producing a plurality of pairs of pellets well suited for use as granular absorbent having carbohydrate polymer binder in each pellet. Such extruder operating conditions where the admixture is gelatinized in the extruder during a gelatinization step and then extruded from the extruder during an extrusion step at an extrusion temperature of at least 135° Celsius (about 275° Fahrenheit) and at an extrusion pressure of at least 800 pounds per square inch (psi) at the extruder head can cause adiabatic extrusion or adiabatic extruder operating conditions to occur helping to form more carbohydrate polymer binder in each pellet. Each pellet produced from such a method preferably has carbohydrate polymer binder in an amount and/or pellet weight percentage in accordance with at least one of the preferred carbohydrate polymer binder containing pellet embodiments described above.

In another such preferred method implementation, admixture is gelatinized during the gelatinization step and extruded from the extruder during the extrusion step at a high enough extrusion temperature ranging between 135° Celsius (about 275° Fahrenheit) and 170° Celsius (about 338° Fahrenheit) and at a high enough extrusion pressure ranging between 800 psi and 1,250 psi at the die of the extruder head causing carbohydrate polymer binder to form during gelatinization and/or during extrusion producing a plurality of pairs of pellets each having carbohydrate polymer binder in an amount and/or pellet weight percentage in accordance with at least one of the preferred carbohydrate polymer binder containing pellet embodiments described above. In still another preferred method implementation, admixture gelatinized during the gelatinization step is extruded from the extruder during the extrusion step at a high enough extrusion temperature ranging between 140° Celsius (about 284° Fahrenheit) and 165° Celsius (about 330° Fahrenheit) and at a high enough extrusion pressure of between 900 psi and 1,200 psi at the die of the extruder head producing extruded pellets in accordance with the present invention each having carbohydrate polymer binder in an amount and/or pellet weight percentage in accordance with at least one of the preferred carbohydrate polymer binder containing pellet embodiments described above. In a further preferred method implementation, admixture gelatinized during the gelatinization step is extruded from the extruder during the extrusion step at a high enough extrusion temperature ranging between 145° Celsius (about 293° Fahrenheit) and 160° Celsius (about 320° Fahrenheit) and at a high enough extrusion pressure of between 900 psi and 1,200 psi, and preferably about 1,100 psi, at the die of the extruder head producing extruded pellets in accordance with the present invention each having carbohydrate polymer binder in an amount and/or pellet weight percentage in accordance with at least one of the preferred carbohydrate polymer binder containing pellet embodiments described above. Under each of the aforementioned extruder temperatures and pressures, the extruder can operate under adiabatic extrusion conditions causing adiabatic extrusion and/or dextrinization to occur that can increase the amount of carbohydrate polymer binder formed in each extruded pellet.

In one preferred implementation of a method of making pellets, admixture that can be a wet admixture is gelatinized in the extruder during a gelatinization step and then extruded from the extruder during an extrusion step at a high enough extrusion temperature of at least 135° Celsius (about 275° Fahrenheit) and at a high enough extrusion pressure of at least 800 pounds per square inch (psi) at the extruder head dextrinizing starch forming dextrin in each one of the plurality of pairs of pellets produced that is soluble in a liquid, preferably water, e.g., urine and/or moisture from fecal matter, forming a flowable binder with at least some of the binder flowing between adjacent pellets causing them to readily self-clump. Such extruder operating conditions where the admixture is gelatinized in the extruder during a gelatinization step and then extruded from the extruder during an extrusion step at an extrusion temperature of at least 135° Celsius (about 275° Fahrenheit) and at an extrusion pressure of at least 800 pounds per square inch (psi) at the extruder head operates the extruder under conditions causing starch dextrinization, e.g., adiabatic extrusion or adiabatic extruder operating conditions, to occur causing dextrin formation. Each pellet produced from such a method preferably has dextrin in an amount, range and/or pellet weight percentage in accordance with at least one of the preferred dextrin containing pellet embodiments described above.

In another such preferred method implementation, admixture gelatinized during the gelatinization step is extruded from the extruder during the extrusion step at a high enough extrusion temperature ranging between 135° Celsius (about 275° Fahrenheit) and 170° Celsius (about 338° Fahrenheit) and at a high enough extrusion pressure ranging between 800 psi and 1,250 psi at the die of the extruder head dextrinizing starch causing water soluble dextrin binder to form during gelatinization and/or during extrusion producing a plurality of pairs of pellets each having dextrin in an amount, range, and/or pellet weight percentage in accordance with at least one of the preferred dextrin containing pellet embodiments described above. In still another preferred method implementation, admixture gelatinized during the gelatinization step is extruded from the extruder during the extrusion step at a high enough extrusion temperature ranging between 140° Celsius (about 284° Fahrenheit) and 165° Celsius (about 330° Fahrenheit) and at a high enough extrusion pressure of between 900 psi and 1,200 psi at the die of the extruder head producing extruded pellets in accordance with the present invention each having dextrin binder in an amount and/or pellet weight percentage in accordance with at least one of the preferred dextrin containing pellet embodiments described above. In a further preferred method implementation, admixture gelatinized during the gelatinization step is extruded from the extruder during the extrusion step at a high enough extrusion temperature ranging between 145° Celsius (about 293° Fahrenheit) and 160° Celsius (about 320° Fahrenheit) and at a high enough extrusion pressure of between 900 psi and 1,200 psi, preferably about 1,100 psi, at the die of the extruder head producing extruded pellets in accordance with the present invention each having dextrin binder in an amount and/or pellet weight percentage in accordance with at least one of the preferred dextrin containing pellet embodiments described above. Under each of the aforementioned extruder temperatures and pressures, the extruder starch dextrinization can and preferably does occur. When operating under such extruder temperatures and pressures, the extruder can be operating under adiabatic extrusion conditions such that adiabatic extrusion occurs causing the formation of dextrin in each extruded pellet and/or increasing the amount of dextrin formed in each extruded pellet.

Post-Extrusion Absorbent Pellet Treatment

Expansion or Puffing Control

In one preferred implementation of a method of making pellets well suited for use as granular absorbent, a pellet expansion or puffing control step can be performed on the pellets right after the extrudate is extruded from the extruder and cut to into pellets by the rotary cutter to help control post-extrusion pellet puffing or expansion. When the pellets are extruded, the pellets tend to keep expanding or puffing for a period of time thereby decreasing their density making them more porous and void filled along with increasing pellet size. When this happens, re-crystallization and/or retrogradation of starch in the pellets can undesirably accelerate.

In a preferred pellet expansion or puffing control step, pellets being extruded are collected in a holding chamber or container, e.g. 40 gallon drum, which can be lined with a plastic liner, e.g. polyethylene or polypropylene trash bag or the like, until at least 5 pounds of the pellets are collected in contact with one another and held for a period of at least 5 minutes causing some pellet drying to occur before being transferred to be dried, treated, coated and/or packaged. In a preferred implementation of such a pellet expansion or puffing control step, the pellets are held in the container until the average temperature of the pellets in contact with one another in the container reaches a temperature of less than 125° Celsius and preferably less than 110° Celsius before being transferred. In another preferred implementation of such a pellet expansion or puffing control step, the pellets are held in the container until the temperature of the outermost pellets reaches a temperature of less than 125° Celsius and preferably less than 110° Celsius before being transferred.

In another preferred pellet expansion or puffing control step, the extruder, such as a single screw or twin screw extruder, is operated in accordance with the extruder operating conditions and parameters disclosed herein causing between 100 pounds and 300 pounds of pellets to be extruded per hour that are collected immediately upon extrusion in a holding chamber, such as a garbage container that can include a plastic liner, e.g. polyethylene or polypropylene trash bag or the like, until at least 15 pounds of the collected pellets are held in contact in the container with one another for a period of at least 5 minutes before being transferred from the container to be dried, treated, coated and/or packaged. In a preferred implementation of such a pellet expansion or puffing control step, the pellets are held in the container until the average temperature of the pellets in contact with one another in the container reaches a temperature of less than 125° Celsius and preferably less than 110° Celsius before being transferred. In another preferred implementation of such a pellet expansion or puffing control step, the pellets are held in the container until the temperature of the outermost pellets reaches a temperature of less than 125° Celsius and preferably less than 110° Celsius before being transferred.

In a further preferred implementation of such a pellet expansion or puffing control step, the pellets are held in the container until the average temperature of the pellets in contact with one another in the container reaches a temperature of less than 105° Celsius and preferably about 100° Celsius before being transferred from the container. In a still further preferred implementation of such a pellet expansion or puffing control step, the pellets are held in the container until the temperature of the outermost pellets reaches a temperature of less than 105° Celsius and preferably about 100° Celsius before being transferred.

Uncoated Absorbent Pellets

Where the pellets produced by extrusion in accordance with the above-discussed method in accordance with the present invention are intended to be used without agglomerating, plating or otherwise applying any absorbent, smectite, hardening, encapsulating and/or clay-based coating to the pellets in a pellet coating step, the pellets can be dried in a drying step before packaging the dried pellets in a packaging step. In one preferred implementation of a method of making pellets in accordance with the present invention, post-extrusion processing includes drying the pellets in an oven, a convection and/or radiant heat dryer, air drying the pellets, or the like until each pellet has a moisture content less than 10% by weight and preferably until each pellet has a moisture content less than 5% by weight. In one such method implementation, the pellets are dried in such a drying step until each pellet has a moisture content of less than 3% by weight and preferably less than 2% by weight.

Unless air dried during the drying step, the pellets can be allowed to stabilize in a stabilizing step for a period of time after the drying step has been performed, preferably for a plurality of hours, before a packaging step is performed where the pellets are packaged in a package suitable for shipment, storage, retail display, retail sale, and consumer or customer use. Where the pellets are air dried, any stabilizing step can be and preferably is performed concurrently with air drying before the packaging step is performed.

Retail pelletized granular absorbent package sizes contemplated include 2.5 pound package sizes, 5 pound package sizes, 10 pound package sizes, 15 pound package sizes and 20 pound package sizes. Such packaging can be in the form of paper packaging, plastic packaging, such as plastic container, plastic tub, or plastic bucket packaging, or in the form of a substantially gas-tight bag, container, tub or bucket. Where gas-tightly sealed, the pellets can be vacuum packed or inert gas packed, e.g., nitrogen, in order to help maximize storage and shelf life.

In one preferred packaging method and embodiment, uncoated pellets are packaged together with one or more packets of desiccant in the package to help maintain desirably low pellet moisture content below a desired moisture content level while packaged. In another preferred packaging method and embodiment, the uncoated pellets are packaged together with one or more packets of desiccant in the package to help control retrogradation of starch in the pellets to help optimize shelf life as well as to help keep the pellet moisture content below a desired level. Where one or more desiccant packets are placed in packages holding uncoated pellets are used for moisture control, a suitable amount of desiccant is used per package to maintain pellet moisture content of less than about 5% moisture by weight. In another preferred packaging method and embodiment, where one or more desiccant packets are placed in packages holding uncoated pellets are used for moisture control, a suitable amount of desiccant is used per package to maintain pellet moisture content of less than about 2% moisture by weight. Where desiccant packets are used, silica gel, activated charcoal, calcium sulfate, calcium chloride, Montmorillonite clay and/or molecular sieves can be used as a desiccant.

In another preferred packaging method and embodiment, uncoated pellets are packaged together with one or more packets of humectant in the package to help maintain desired pellet moisture content above a desired moisture content level while packaged to help limit starch retrogradation to help optimize shelf life and performance.

In one such preferred packaging method and embodiment, the uncoated pellets are packaged together with one or more packets of humectant in the package to help reduce or substantially freeze the rate retrogradation of starch in the pellets to help optimize shelf life and maximize performance. Where humectant packets are used, glycerine, sorbitol, polydextrose, or another suitable hygroscopic substance can be used as a humectant.

Uncoated Treated Absorbent Pellets

Where the pellets produced by extrusion in accordance with the above-discussed method in accordance with the present invention are treated after extrusion but intended to be used without agglomerating, plating or otherwise applying any absorbent, smectite, hardening, encapsulating and/or clay-based coating to the pellets in a pellet coating step, the pellets can be treated after extrusion with a liquid, e.g., water, and/or powder treatment that inhibits odor, inhibits urea degradation, inhibits urease formation, inhibits bacterial growth, inhibits fungal growth, inhibits viral growth, and/or inhibits yeast growth. Where such a post-extrusion treatment is applied to the pellets, it can be applied or otherwise sprayed onto the pellets while the pellets are being mechanically agitated, pneumatically agitated, or agitated in another manner. If desired, the treatment of the pellets with one or more such inhibitors can be done after or during application of a surfactant, a plating agent or another substance that facilitates retention and/or absorption of the inhibitor(s) by the pellets.

Such a post-extrusion treatment step can be performed relatively soon after extrusion, such as preferably within between 5 minutes and two hours of pellet extrusion to facilitate retention and/or absorption of the inhibitor(s) by the pellets. Such a post-extrusion treatment step can be performed prior to, during or even after the drying step, where a drying step is performed after pellet extrusion to reduce the pellet moisture content below a desired moisture content level in accordance with that disclosed in the preceding subsection above. If desired, the pellets can be subjected to a pellet stabilization step in accordance with that also disclosed above in the preceding subsection.

Coated Absorbent Pellets

Where pellets produced by extrusion in accordance with the above-discussed method in accordance with the present invention are coated after extrusion by applying an absorbent, smectite, hardening, encapsulating and/or clay-based coating to the pellets in a pellet coating step, the pellets can be coated within a relatively short period of time after extrusion while the carbohydrate polymer binder and/or dextrin binder of each pellet is still wet, sticky and/or tacky causing the coating more quickly and efficiently adhere to and substantially completely coat each pellet. In one preferred implementation of a pellet coating method in accordance with the present invention, the coating step is performed on pellets substantially immediately after the pellets are extruded from the extruder within no more than one half hour after extrusion while the carbohydrate polymer binder and/or dextrin binder of the outer pellet surface is still sticky or tacky causing the coating more quickly and efficiently adhere to and substantially completely coat each pellet. In another preferred implementation of a pellet coating method right after extrusion, the coating step is performed within a period ranging from within 5 minutes after extrusion to no longer than one hour after extrusion while the carbohydrate polymer binder and/or dextrin binder on the outer surface of each pellet preferably is still somewhat wet, sticky and/or tacky causing the coating more quickly, more efficiently and/or more thoroughly adhere to and substantially completely coat each pellet.

During the coating step, the uncoated pellets can be and preferably are collected and transferred to an agglomerator, such as a commercially available agglomerator, such as a commercially available coating tumbler or the like. Depending on the circumstances, more than one agglomerator, e.g., coating tumbler, can be used with a particular coating step or specific part of the coating step being performed on pellets in one coating tumbler before the partially coated pellets are transferred to another coating tumbler where another coating step or another part of the coating step is performed.

During the coating step, a powdered coating in accordance with that disclosed above in the ABSORBENT PELLET COATINGS AND COATING METHODS section is applied to the pellets using one or more of the coating methods also disclosed above in the ABSORBENT PELLET COATINGS AND COATING METHODS section. Doing so coats each pellet with a coating that can be of an absorptive composition that not only substantially completely encapsulates each pellet but which also increases the crush strength and hardness of each pellet.

Where the coating is applied together with a liquid, e.g., water, during the coating step, such as by being either dissolved and/or entrained in the liquid used to apply the coating, the liquid can help tackify the carbohydrate polymer binder and/or dextrin binder containing outer surface of each pellet helping the coating to adhere to each pellet during the coating step. Such a liquid can include a substance or component that either helps to cause the coating to adhere to each pellet and/or helps tackify the carbohydrate polymer binder and/or dextrin binder containing outer surface to help cause the coating to adhere to each pellet.

Once the coating is applied, the coated pellets can be subjected to a drying step and/or stabilization step, such as discussed above, before the pellets are packaged in packaging in accordance with that discussed above. Such packaging can also include one or more packets of desiccant and/or humectant packaged together with the coated pellets to help control pellet moisture and/or limit starch retrogradation helping to optimize shelf life and performance.

Coated Treated Absorbent Pellets

If desired, extruded pellets can be treated and coated including as respectively discussed in the above UNCOATED TREATED ABSORBENT PELLETS subsection with any one or more of the coating formulations disclosed above in the ABSORBENT PELLET COATINGS AND COATING METHODS section set forth above and in the above COATED ABSORBENT PELLETS subsection with any one or more of the treatments also disclosed above in the same ABSORBENT PELLET COATINGS AND COATING METHODS section. Any treatment step can be performed prior to or during the coating step. Once the coating and treatment steps have been performed, the coated pellets can be subjected to a drying step and/or stabilization step, such as discussed above, before the pellets are packaged in packaging in accordance with that discussed above. Such packaging can also include one or more packets of desiccant and/or humectant packaged together with the coated pellets to help control pellet moisture and/or limit starch retrogradation helping to optimize shelf life and performance.

Preferred Absorbent Pellet Formulations and Methods

First Pellet Formulation and Method

A first preferred admixture for extruding pellets well suited for use as granular absorbent is corn-based and formed of the following constituents:

| | |
|---|---|
| Cornmeal | 70%-80% |
| Cellulosic Material | 20%-30% |
| Total Mixture (before adding water) | 100% |
| Water (Liters per 100 lbs of Admixture) | 4.7-5.5 |

The cornmeal can be coarsely ground or finely ground as known in the industry. The cornmeal can be degermed cornmeal or whole grain cornmeal made of yellow corn or another suitable corn or maize. Suitable cornmeals include CCM 260 and/or YCM 260 milled cornmeals commercially available from Bunge North America of 11720 Borman Drive, St. Louis, Mo. The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger. Between 4.7 liters and 5.5 liters of water are added for every 100 pounds of the total mixture such that the wet admixture has a moisture content ranging between about 9.0% and about 11.0% and preferably between 9.4% and 10.8% of wet admixture weight.

The corn meal is mixed, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw corn meal mixture is transferred into the extruder hopper, the cellulosic material is added to the blended mixture mixing everything together in a second mixing step forming a dry admixture to which water is added in a water adding step before undergoing gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, water or another liquid causing self-clumping of the pellet with adjacent pellets during liquid absorption by the pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the ABSORBENT PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause starch dextrinization to occur dextrinizing starch during extrusion thereby forming dextrin in each extruded pellet. Where starch dextrinization occurs during extrusion, each pellet has a dextrin content varying between 0.15% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the ABSORBENT PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions impacting the amount of starch converted into dextrin during extrusion.

During the gelatinization step and extrusion step, the extruder is operated at an extrusion temperature of at least 135° Celsius (about 275° Fahrenheit) and at an extrusion pressure of at least 800 pounds per square inch (psi) at the extruder head extruding the gelatinized admixture out an extrusion die having a die opening of between 0.03 inches and 0.1 inches. Operating under these extrusion parameters and/or the extrusion parameters disclosed below, uncoated pellets having a width or diameter of between about 1.5 millimeters and 2.2 millimeters and a length of between 1.5 and 2.5 millimeters can be produced using a 0.03 inch extruder head die opening. Operating under these extrusion parameters and/or the extrusion parameters disclosed below, uncoated pellets having a width or diameter of between about 2.5 millimeters and 3.5 millimeters and a length of between 3.0 and 3.9 millimeters can be produced using a 0.1 inch extruder head die opening.

Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 800 psi and 1,250 psi. In another preferred set of extruder operating parameters, such a single screw extruder can be operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is used when needed to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, such a method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters can be and preferably is produced using a 0.03 inch extruder head die opening. Operating under such extrusion parameters, uncoated pellets having a width or diameter of between about 2.5 millimeters and 3.5 millimeters and a length of between 3.0 and 3.9 millimeters can be and preferably is produced using a 0.1 inch extruder head die opening.

As discussed above, the pellets can be (a) packaged after extrusion, (b) dried and then packaged after extrusion, (c) dried, stabilized and then packaged after extrusion, (d) treated and packaged after extrusion, (e) treated, dried and packaged after extrusion, (f) treated, dried, stabilized and packaged after extrusion, (g) coated and packaged after extrusion, (h) coated, dried and packaged after extrusion, (i) treated/coated and packaged after extrusion, or (j) treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay-based coating preferably includes bentonite, such as sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay-based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based granular absorbent and possess water absorption of at least 80% of conventional clay-based granular absorbent. As a result, performance of coated absorbent pellets in accordance with the present invention is substantially the same as conventional clay-based granular absorbent but weighs less than half that of conventional clay-based granular absorbent for a given package volume or package size.

In one preferred embodiment, it is contemplated that uncoated pellets can also be packaged and sold for use as an absorbent and is preferably well suited for use as cat litter. In another preferred embodiment, the pellets are coated with a clay-based coating as discussed above before being packaged and sold.

Second Pellet Formulation and Method

A second preferred admixture for extruding pellets well suited for use as granular absorbent also capable of use as pet or animal litter also is corn-based and formed of the following constituents:

| | |
|---|---|
| Cornmeal | 70%-80% |
| Cellulosic Material | 20%-30% |
| Total Mixture (before adding water) | 100% |
| Water (Liters per 100 lbs of Admixture) | 4.9-5.2 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger. Between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The corn meal and/or corn flour is mixed together, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw corn meal and/or corn meal mixture is transferred into the extruder hopper, the cellulosic material, preferably hay, is added to the blended mixture mixing everything together in a second mixing step forming a dry admixture to which water is added in a water adding step before undergoing gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the ABSORBENT PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that causes starch dextrinization occur which can also cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the ABSORBENT PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions that increase or decrease the amount of dextrin formed during pellet extrusion.

During the gelatinization step and extrusion step, the extruder is operated at an extrusion temperature of between 140° Celsius (about 284° Fahrenheit) and 170° Celsius (about 338° Fahrenheit) and at an extrusion pressure of between 900 psi and 1,200 psi at the extruder head extruding the gelatinized admixture out an extrusion die having a die opening of between 0.03 inches and 0.1 inches. Where the extruder is a single screw extruder, such a single screw extruder preferably is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 165° Celsius (about 330° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters can be and preferably is produced using a 0.03 inch extruder head die opening. Operating under such extrusion parameters, uncoated pellets having a width or diameter of between about 2.5 millimeters and 3.5 millimeters and a length of between 3.0 and 3.9 millimeters can be and preferably is produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and/or no more than 8% coating formulation weight of silica, e.g., crystalline silica.

After coating, pellets produced using a 0.3 inch extruder head die opening have a width or diameter ranging between about 1.6 millimeters and 3.2 millimeters and a length of between 1.6 and 3.5 millimeters. After coating, pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based granular absorbent and water absorption of at least 80% of conventional clay-based granular absorbent. As a result, performance of coated pellets in accordance with the present invention is substantially the same as conventional clay-based granular absorbents but weighs less than half that of conventional clay-based granular absorbents for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold.

Third Pellet Formulation and Method

A third preferred admixture for extruding pellets well suited for use as granular absorbent as well as cat litter also is corn-based and formed of the following constituents:

| | |
|---|---|
| Cornmeal | ≈75% ± 5% |
| Cellulosic Material | ≈25% ± 5% |
| Total Mixture (before adding water) | 100% |
| Water (Liters per 100 lbs of Admixture) | 4.7-5.5/4.9-5.2 |

The cornmeal can be coarsely ground or finely ground as known in the industry. The cornmeal can be degermed cornmeal or whole grain cornmeal made of yellow corn or another suitable corn or maize. Suitable cornmeals include CCM 260 (degermed) and/or YCM 260 (whole grain) milled cornmeals commercially available from Bunge North America of 11720 Borman Drive, St. Louis, Mo. A combination of degermed and whole grain cornmeals can be mixed together to form the dry raw material (cornmeal) mixture. In certain instances, corn grits can be substituted for all or part of the corn meal.

The cornmeal mixture or formulation has at least 70% carbohydrate content by cornmeal weight and at least 60% starch by cornmeal weight. Another preferred cornmeal mixture or formulation well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger.

In one pellet formulation and pellet making method, between 4.7 liters and 5.5 liters of water are added for every 100 pounds of the total mixture such that the wet admixture has a moisture content ranging between about 9.0% and about 11.0% and preferably between 9.4% and 10.8% of wet admixture weight. In another preferred pellet formulation and pellet making method, between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The corn meal is mixed, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw corn meal and/or corn meal mixture is transferred into the extruder hopper, the cellulosic material, preferably hay, is added to the blended mixture mixing everything together in a second mixing step forming a dry admixture to which water is added in a water adding step before undergoing gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 1% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the ABSORBENT PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that can cause adiabatic extrusion to occur dextrinizing starch during extrusion thereby forming dextrin in each extruded pellet. Where starch dextrinization occurs during extrusion, each pellet has a dextrin content varying between 1% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the ABSORBENT PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of between 140° Celsius (about 284° Fahrenheit) and 170° Celsius (about 338° Fahrenheit) and at an extrusion pressure of between 900 psi and 1,200 psi at the extruder head extruding the gelatinized admixture out an extrusion die having a die opening of between 0.03 inches and 0.1 inches. Where the extruder is a single screw extruder, such a single screw extruder preferably is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 165° Celsius (about 330° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters can be and preferably is produced using a 0.03 inch extruder head die opening. Operating under such extrusion parameters, uncoated pellets having a width or diameter of between about 2.5 millimeters and 3.5 millimeters and a length of between 3.0 and 3.9 millimeters can be and preferably is produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and/or no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based granular absorbent and water absorption of at least 80% of conventional clay-based absorbent. As a result, performance of coated absorbent pellets in accordance with the present invention is substantially the same as conventional clay-based absorbent but weighs less than half that of conventional clay-based absorbent for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Fourth Pellet Formulation and Method

A fourth preferred admixture for extruding pellets well suited for use as granular absorbent as well as pet or animal litter also is corn-based and formed of the following constituents:

| Cornmeal | ≈100% |
|---|---|
| Total Mixture (before adding water) | 100% |
| Water (Liters per 100 lbs of Admixture) | 4.7-5.5/4.9-5.2 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. In one preferred pellet embodiment and method of pellet making, substantially all of the cornmeal is degermed yellow cornmeal that preferably is CCM 260 degermed yellow cornmeal. In another preferred pellet embodiment, substantially all of the cornmeal is degermed yellow cornmeal that preferably is YCM 260 whole grain yellow cornmeal. In certain instances, corn grits can be substituted for all or part of the corn meal.

In still another preferred pellet embodiment and method of pellet making, the cornmeal is made of a mixture of degermed yellow cornmeal, e.g. CCM 260, and whole grain yellow cornmeal, e.g., YCM 260, whose weight percentages can be varied from any ratio between 75% degermed yellow cornmeal and 25% whole grain yellow cornmeal to 25% degermed yellow cornmeal and 75% whole grain yellow cornmeal. One preferred degermed—whole grain cornmeal mixture has about 50% (±5%) degermed yellow cornmeal and about 50% (±5%) whole grain yellow cornmeal.

The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

In one pellet formulation and pellet making method, between 4.7 liters and 5.5 liters of water are added for every 100 pounds of the total mixture such that the wet admixture has a moisture content ranging between about 9.0% and about 11.0% and preferably between 9.4% and 10.8% of wet admixture weight. In another preferred pellet formulation and pellet making method, between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The cornmeal is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 1% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the ABSORBENT PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that can cause adiabatic extrusion to occur dextrinizing starch during extrusion thereby forming dextrin in each extruded pellet. Where starch dextrinization occurs during extrusion, each pellet has a dextrin content varying between 1% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the ABSORBENT PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 800 pounds per square inch (psi) at the extruder head extruding the gelatinized admixture out an extrusion die having a die opening of between 0.03 inches and 0.1 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 800 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone can be desired where needed in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters can be and preferably is produced using a 0.03 inch extruder head die opening. Operating under such extrusion parameters, uncoated pellets having a width or diameter of between about 2.5 millimeters and 3.5 millimeters and a length of between 3.0 and 3.9 millimeters can be and preferably is produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, pellets produced using a 0.3 inch extruder head die opening have a width or diameter ranging between about 1.6 millimeters and 3.2 millimeters and a length of between 1.6 and 3.5 millimeters. After coating, pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based absorbent and water absorption of at least 80% of conventional clay-based absorbent. As a result, performance of coated absorbent pellets in accordance with the present invention is substantially the same as conventional clay-based absorbent but weighs less than half that of conventional clay-based absorbent for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Fifth Pellet Formulation and Method

A fifth preferred admixture for extruding pellets well suited for use as granular absorbent also is corn-based and formed of the following constituents:

| | |
|---|---|
| Cornmeal | 65%-85% |
| Cellulosic Material | 15%-35% |
| Total Mixture (before adding water) | 100% |
| Water (Liters per 100 lbs of Admixture) | 2-3/2.4-2.6 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. In one preferred pellet embodiment and method of pellet making, substantially all of the cornmeal is degermed yellow cornmeal that preferably is CCM 260 degermed yellow cornmeal. In another preferred pellet embodiment, substantially all of the cornmeal is degermed yellow cornmeal that preferably is YCM 260 whole grain yellow cornmeal. In certain instances, corn grits can be substituted for all or part of the corn meal.

In still another preferred pellet embodiment and method of pellet making, the cornmeal is made of a mixture of degermed yellow cornmeal, e.g. CCM 260, and whole grain yellow cornmeal, e.g., YCM 260, whose weight percentages can be varied from any ratio between 75% degermed yellow cornmeal and 25% whole grain yellow cornmeal to 25% degermed yellow cornmeal and 75% whole grain yellow cornmeal. One preferred degermed—whole grain cornmeal mixture has about 50% (±5%) degermed yellow cornmeal and about 50% (±5%) whole grain yellow cornmeal.

The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

In one pellet formulation and pellet making method, between 2 liters and 3 liters of water are added for every 100 pounds of the total mixture such that the wet admixture has a moisture content no more than about 10% having a moisture content ranging between about 4.0% and about 9.0% and preferably between 4.2% and 8.1% of wet admixture weight. In another preferred pellet formulation and pellet making method, between 2.4 liters and 2.6 liters of water are added for every 100 pounds of the total mixture such that the wet admixture has a moisture content ranging between about 4.8% and about 5.6% and preferably between 5% and 5.5% of wet admixture weight.

The cornmeal is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of liquid soluble carbohydrate polymer binder in the gelatinized admixture either during gelatinization and/or during extrusion so that each extruded pellet has enough carbohydrate polymer binder present that at least some of the binder dissolves when wetted by urine, fecal matter moisture, water or another liquid causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the ABSORBENT PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that also can cause adiabatic extrusion to occur during starch dextrinization thereby dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the ABSORBENT PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 600 pounds per square inch (psi) at the extruder head extruding the gelatinized admixture out an extrusion die having a die opening of between 0.01 inches and 0.05 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 600 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 600 psi and 1,200 psi.

In another preferred method, the extruder can include at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 600 psi and 1,200 psi. The use of an extruder with at least one compression screw or at least one screw having at least one compression section or zone can be utilized when it is needed in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 2 millimeters and 4 millimeters and a length of between 2 and 4 millimeters can be and preferably are produced. These uncoated pellets have a bulk density no greater than 0.4 grams per cubic centimeter and preferably between 0.30 grams per cubic centimeter and 0.35 grams per cubic centimeter (preferably about 0.317 grams per cubic centimeter). These uncoated pellets have an ASTM oil absorbancy of at least 1.25 grams per gram and between 1.25 grams per gram and 1.80 grams per gram (preferably about 1.60 grams per gram). These uncoated pellets have an ASTM water absorbancy of at least 0.7 grams per gram and between 0.7 grams per gram and 0.9 grams per gram (preferably about 0.81 grams per gram). Such uncoated pellets have a sieve analysis of between 2%-3% retained by a #5 mesh, between 25%-

30% retained by a #8 mesh, between 60%-75% retained by a #10 mesh, and no more than 3% retained by the pan.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, the pellets have a width or diameter ranging between about 2.1 millimeters and 5 millimeters and a length of between 2.1 and 5 millimeters. The coated pellets have a bulk density no greater than 0.75 grams per cubic centimeter and preferably between 0.65 grams per cubic centimeter and 0.58 grams per cubic centimeter (preferably about 0.616 grams per cubic centimeter). The coated pellets have an ASTM oil absorbancy of at least 2.0 grams per gram and between 2.0 grams per gram and 2.75 grams per gram (preferably about 2.5 grams per gram). These coated pellets have an ASTM water absorbancy of at least 1.8 grams per gram and between 1.8 grams per gram and 2.25 grams per gram (preferably about 2.15 grams per gram). Such coated pellets have a sieve analysis of no more than 2% retained by a #5 mesh, between 45%-60% retained by a #8 mesh, between 40%-50% retained by a #10 mesh with less than 1% retained by the pan.

Coated pellets of such size advantageously have a size similar to that of conventional granular clay-based absorbents and water absorption of at least 70% of conventional clay-based absorbents. As a result, performance of coated pellets in accordance with the present invention is substantially the same as conventional clay-based granular absorbents but weigh less than half that of conventional clay-based absorbents for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Sixth Pellet Formulation and Method

A sixth preferred admixture for extruding pellets well suited for use as granular absorbent also is corn-based and formed of the following constituents:

| Cornmeal | 75% ± 5% |
| Cellulosic Material | 25% ± 5% |
| Total Mixture (before adding water) | 100% |
| Water (Liters per 100 lbs of Admixture) | 2-3/2.4-2.6 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. In one preferred pellet embodiment and method of pellet making, substantially all of the cornmeal is degermed yellow cornmeal that preferably is CCM 260 degermed yellow cornmeal. In another preferred pellet embodiment, substantially all of the cornmeal is degermed yellow cornmeal that preferably is YCM 260 whole grain yellow cornmeal. In certain instances, corn grits can be substituted for all or part of the corn meal.

In still another preferred pellet embodiment and method of pellet making, the cornmeal is made of a mixture of degermed yellow cornmeal, e.g. CCM 260, and whole grain yellow cornmeal, e.g., YCM 260, whose weight percentages can be varied from any ratio between 75% degermed yellow cornmeal and 25% whole grain yellow cornmeal to 25% degermed yellow cornmeal and 75% whole grain yellow cornmeal. One preferred degermed—whole grain cornmeal mixture has about 50% (±5%) degermed yellow cornmeal and about 50% (±5%) whole grain yellow cornmeal.

The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

In one pellet formulation and pellet making method, between 2 liters and 3 liters of water are added for every 100 pounds of the total mixture such that the wet admixture has a moisture content ranging between about 4.0% and about 9.0% and preferably between 4.2% and 8.1% of wet admixture weight. In another preferred pellet formulation and pellet making method, between 2.4 liters and 2.6 liters of water are added for every 100 pounds of the total mixture such that the wet admixture has a moisture content ranging between about 4.8% and about 5.6% and preferably between 5% and 5.5% of wet admixture weight.

The cornmeal is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that can cause adiabatic extrusion to occur further dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 600 pounds per square inch (psi) at the extruder head extruding the gelatinized admixture out an extrusion die having a die opening of between 0.01 inches and 0.05 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 600 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 600 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 600 psi and 1,200 psi. The use of an extruder with at least one compression screw or at least one screw having at least one compression section or zone can be preferred where needed in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 2 millimeters and 4 millimeters and a length of between 2 and 4 millimeters can be and preferably is produced. These uncoated pellets have a bulk density no greater than 0.4 grams per cubic centimeter and preferably between 0.30 grams per cubic centimeter and 0.35 grams per cubic centimeter (preferably about 0.317 grams per cubic centimeter). These uncoated pellets have an ASTM oil absorbancy of at least 1.25 grams per gram and between 1.25 grams per gram and 1.80 grams per gram (preferably about 1.60 grams per gram). These uncoated pellets have an ASTM water absorbancy of at least 0.7 grams per gram and between 0.7 grams per gram and 0.9 grams per gram (preferably about 0.81 grams per gram). Such uncoated pellets have a sieve analysis of between 2%-3% retained by a #5 mesh, between 25%-30% retained by a #8 mesh, between 60%-75% retained by a #10 mesh, and no more than 3% retained by the pan.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, the pellets have a width or diameter ranging between about 2.1 millimeters and 5 millimeters and a length of between 2.1 and 5 millimeters. The coated pellets have a bulk density no greater than 0.75 grams per cubic centimeter and preferably between 0.65 grams per cubic centimeter and 0.58 grams per cubic centimeter (preferably about 0.616 grams per cubic centimeter). The coated pellets have an ASTM oil absorbancy of at least 2.0 grams per gram and between 2.0 grams per gram and 2.75 grams per gram (preferably about 2.5 grams per gram). These coated pellets have an ASTM water absorbancy of at least 1.8 grams per gram and between 1.8 grams per gram and 2.25 grams per gram (preferably about 2.15 grams per gram). Such coated pellets have a sieve analysis of no more than 2% retained by a #5 mesh, between 45%-60% retained by a #8 mesh, between 40%-50% retained by a #10 mesh with less than 1% retained by the pan.

Coated pellets of such size advantageously have a size similar to that of conventional granular clay-based absorbents and water absorption of at least 70% of conventional clay-based absorbents (including conventional clay-based cat litter). As a result, performance of coated pellets in accordance with the present invention is at least as good as conventional clay-based absorbents but weigh less than half that of conventional clay-based absorbents for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Seventh Pellet Formulation and Method

A seventh preferred admixture for extruding pellets well suited for use as granular absorbent is corn-based and formed of the following constituents:

| | |
|---|---|
| Corn Flour | 70%-80% |
| Cellulosic Material | 20%-30% |
| Total Mixture (before adding water) | 100% |
| Water (Liters per 100 lbs of Admixture) | 4.7-5.5 |

The corn flour can be made from degermed corn or whole grain corn made of yellow corn, white corn, and/or another suitable corn or maize. The corn flour has at least 70% carbohydrate content by corn flour weight and at least 60% starch by corn flour weight. Another preferred corn flour well suited for use in such a pellet formulation has at least 75% carbohydrate content by corn flour weight and at least 65% starch by corn flour weight. The corn flour has at least 55% amylopectin and an amylose:amylopectin ratio of between 10:90 and 45:55. Another preferred corn flour has at least 60% amylopectin and an amylose:amylopectin ratio of between 15:85 and 40:60. Another preferred corn flour has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger. Between 4.7 liters and 5.5 liters of water are added for every 100 pounds of the total mixture such that the wet admixture has a moisture content ranging between about 9.0% and about 11.0% and preferably between 9.4% and 10.8% of wet admixture weight.

The corn flour is mixed, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw corn flour mixture is transferred into the extruder hopper, the cellulosic material is added to the blended mixture mixing everything together in a second mixing step forming a dry admixture to which water is added in a water adding step before undergoing gelatinization in the extruder. If desired, at least some water can be added during mixing or blending of the corn flour before the corn flour is mixed or blended with the cellulosic material to activate one or more of starches, proteins, lipids, sugars or the like in the corn flour.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of liquid soluble carbohydrate polymer binder in the gelatinized admixture either during gelatinization and/or during extrusion so that each extruded pellet has enough carbohydrate polymer binder present that at least some of the binder dissolves when wetted by urine, fecal matter moisture, water or another liquid causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that can cause adiabatic extrusion to occur but which causes starch dextrinization during extrusion thereby forming dextrin in each extruded pellet. Where starch dextrinization occurs during extrusion, each pellet has a dextrin content varying between 0.25% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 800 pounds per square inch (psi) at the extruder head extruding the gelatinized admixture out an extrusion die having a die opening of between 0.03 inches and 0.1 inches. Operating under these extrusion parameters and/or the extrusion parameters disclosed below, uncoated pellets having a width or diameter of between about 1.5 millimeters and 2.2 millimeters and a length of between 1.5 and 2.5 millimeters can be and preferably are produced using a 0.03 inch extruder head die opening. Operating under these extrusion parameters and/or the extrusion parameters disclosed below, uncoated pellets having a width or diameter of between about 2.5 millimeters and 3.5 millimeters and a length of between 3.0 and 3.9 millimeters can be and preferably are produced using a 0.1 inch extruder head die opening.

Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 800 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder can be configured with at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred where needed in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters can be and preferably is produced using a 0.03 inch extruder head die opening. Operating under such extrusion parameters, uncoated pellets having a width or diameter of between about 2.5 millimeters and 3.5 millimeters and a length of between 3.0 and 3.9 millimeters can be and preferably is produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based absorbents and water absorption of at least 80% of conventional clay-based absorbents. As a result, performance of coated pellets in accordance with the present invention is at least substantially the same as conventional clay-based granular absorbents but weigh less than half that of conventional clay-based absorbents for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Eighth Pellet Formulation and Method

An eighth preferred admixture for extruding pellets well suited for use as granular absorbent is rice-based and formed of the following constituents:

| | |
|---|---|
| Rice Meal | 70%-80% |
| Cellulosic Material | 20%-30% |
| Total Mixture (before adding water) | 100% |
| Water (Liters per 100 lbs of Admixture) | 4.9-5.2 |

The rice meal can be coarsely ground or finely ground as known in the industry. The rice meal can be degermed or whole grain rice meal made of a short grained rice, a long grained rice and/or a wild rice. The rice meal used can be a mixture of degermed rice meal and/or whole grain rice meal. The rice meal has at least 70% carbohydrate content by rice meal weight and at least 60% starch by rice meal weight. Another preferred rice meal well suited for use in such a pellet formulation has at least 75% carbohydrate content by rice meal weight and at least 65% starch by rice meal weight. The rice meal has at least 55% amylopectin and an amylose: amylopectin ratio of between 10:90 and 45:55. Another preferred rice meal has at least 60% amylopectin and an amylose:amylopectin ratio of between 15:85 and 40:60. Another preferred rice meal has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger. Between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The rice meal is mixed together, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw rice meal mixture is transferred into the extruder hopper, the cellulosic material, preferably hay, is added to the blended mixture mixing everything together in a second mixing step forming a dry admixture to which water is added in a water adding step before undergoing gelatinization in the extruder. If desired, at least some water can be added during mixing or blending of the rice meal before the rice meal is mixed or blended with the cellulosic material to activate one or more of starches, proteins, lipids, sugars or the like in the rice meal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause starch dextrinization to occur which can also cause adiabatic extrusion to occur during formation of dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of between 140° Celsius (about 284° Fahrenheit) and 170° Celsius (about 338° Fahrenheit) and at an extrusion pressure of between 900 psi and 1,200 psi at the extruder head extruding the gelatinized admixture out an extrusion die having a die opening of between 0.03 inches and 0.1 inches. Where the extruder is a single screw extruder, such a single screw extruder preferably is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 165° Celsius (about 330° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred when desired in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters can be and preferably is produced using a 0.03 inch extruder head die opening. Operating under such extrusion parameters, uncoated pellets having a width or diameter of between about 2.5 millimeters and 3.5 millimeters and a length of between 3.0 and 3.9 millimeters can be and preferably is produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and/or no more than 8% coating formulation weight of silica, e.g., crystalline silica.

After coating, pellets produced using a 0.3 inch extruder head die opening have a width or diameter ranging between about 1.6 millimeters and 3.2 millimeters and a length of between 1.6 and 3.5 millimeters. After coating, pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based absorbents and water absorption of at least 80% of conventional clay-based absorbents. As a result, performance of coated pellets in accordance with the present invention is substantially the same as conventional clay-based granular absorbents but weighs less than half that of conventional clay-based absorbents for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Ninth Pellet Formulation and Method

A ninth preferred admixture for extruding pellets well suited for use as granular absorbent is corn-based and formed of the following constituents:

| | |
|---|---|
| Cornstarch | ≈75% ± 5% |
| Cellulosic Material | ≈25% ± 5% |
| Total Mixture (before adding water) | 100% |
| Water (Liters per 100 lbs of Admixture) | 4.7-5.5/4.9-5.2 |

The cornstarch can be coarsely ground, finely ground and/or ground to form a flour as known in the industry. If desired, the cornstarch can be mixed together with one of a cornmeal, corn grits, corn flour, rice meal, rice grits, and/or rice flour producing a dry admixture before mixing with the cellulosic material falling within the ≈75%±5% dry admixture weight range. The cornstarch mixture or formulation has at least 70% carbohydrate content by cornstarch weight and at least 60% starch by cornstarch weight. Another preferred cornstarch mixture or formulation well suited for use in such a pellet formulation has at least 75% carbohydrate content by cornmeal weight and at least 65% starch by cornstarch weight. The cornstarch has at least 55% amylopectin and an amylose:amylopectin ratio of between 10:90 and 45:55. Another preferred cornstarch has at least 60% amylopectin and an amylose:amylopectin ratio of between 15:85 and 40:60. Another preferred cornstarch has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger (e.g., 30 mesh, 50 mesh, etc.). Another preferred cellulose material is beet pulp and/or wood fiber that is comminuted if needed such that its particles have a mesh size of 20 mesh or larger (e.g., 30 mesh, 50 mesh, etc.).

In one pellet formulation and pellet making method, between 4.7 liters and 5.5 liters of water are added for every 100 pounds of the total mixture such that the wet admixture has a moisture content ranging between about 9.0% and about 11.0% and preferably between 9.4% and 10.8% of wet admixture weight. In another preferred pellet formulation and pellet making method, between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The cornstarch is mixed, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw cornstarch mixture is transferred into the extruder hopper, the cellulosic material, preferably hay, is added to the blended mixture mixing everything together in a second mixing step forming a dry admixture to which water is added in a water adding step before undergoing gelatinization in the extruder. If desired, at least some water can be added during mixing or blending of the cornstarch before the cornstarch is mixed or blended with the cellulosic material.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of liquid, e.g., water, soluble carbohydrate polymer binder in the gelatinized admixture either during gelatinization and/or during extrusion so that each extruded pellet has enough carbohydrate polymer binder present that at least some of the binder dissolves when wetted by urine, fecal matter moisture, water, or another liquid being absorbed by the pellets causing clumping with adjacent pellets. Each pellet has a carbohydrate polymer binder content varying between 1% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that can cause adiabatic extrusion to occur dextrinizing starch during extrusion thereby forming dextrin in each extruded pellet. Where starch dextrinization occurs during extrusion, each pellet has a dextrin content varying between 1% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of between 140° Celsius (about 284° Fahrenheit) and 170° Celsius (about 338° Fahrenheit) and at an extrusion pressure of between 900 psi and 1,200 psi at the extruder head extruding the gelatinized admixture out an extrusion die having a die opening of between 0.03 inches and 0.1 inches. Where the extruder is a single screw extruder, such a single screw extruder preferably is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder can be configured with at least one compression screw or at least one screw with at least one compression section or zone that is operated at an extrusion temperature of between 145° Celsius (about 293° Fahrenheit) and 165° Celsius (about 330° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone can be desired where it is needed in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters can be and preferably is produced using a 0.03 inch extruder head die opening. Operating under such extrusion parameters, uncoated pellets having a width or diameter of between about 2.5 millimeters and 3.5 millimeters and a length of between 3.0 and 3.9 millimeters can be and preferably is produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and/or no more than 8% coating formulation weight of silica, e.g., crystalline silica.

After coating, pellets produced using a 0.3 inch extruder head die opening have a width or diameter ranging between about 1.6 millimeters and 3.2 millimeters and a length of between 1.6 and 3.5 millimeters. After coating, pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based absorbents and water absorption of at least 80% of such conventional absorbents. As a result, performance of coated pellets produced in accordance with the present invention is at least as good as conventional clay-based absorbents but weigh less than half that of conventional clay-based absorbents for a given package volume or package size.

In one preferred method of making an admixture that includes starch is gelatinized in an extruder under sufficient pressure and temperature causing a clumping agent to form that includes a carbohydrate polymer binder formed of at least some of the starch in the admixture during extrusion from the extruder producing a plurality of extruded pellets having a bulk density no greater than 0.7 grams per cubic centimeter having carbohydrate polymer binder clumping agent that preferably is water soluble. In one preferred method, at least part, if not all, of the carbohydrate polymer binder clumping agent includes or is formed of dextrin.

During operation of the extruder in carrying out the method of making granular absorbent, the admixture (after any water has been added) has a moisture content low enough and the extruder operates at an extrusion pressure and temperature high enough to dextrinize starch in the admixture during at least one of gelatinization and extrusion by the extruder forming dextrin in each pellet. In one preferred implementation of the method, the admixture (after any water has been added, i.e. wet admixture) has a moisture content of no more than 18% by total wet admixture weight and the extruder extrudes the plurality of pellets at an extrusion pressure of at least 800 pounds per square inch and at extrusion temperature of at least 135° Celsius. Under such extruder operating conditions, adiabatic extruder operating conditions can occur during extruding the plurality of pellets increasing the amount of dextrin formed in each pellet.

One such method of making granular absorbent produces absorbent pellets each having at least 0.1% dextrin by weight. Another such method produces pellets each having at least 2% dextrin by weight. Still another such method produces pellets each having between 0.1% and 5% dextrin by weight. Another such method produces pellets each having between 2% and 10% dextrin by weight.

One preferred admixture well suited for use with a method of making of making granular absorbent formed of such absorbent pellets has at least one cereal grain with a high carbohydrate content of at least 45% by cereal grain weight. Such an admixture can be formed of at least 70% by dry admixture weight of at least one cereal grain having a high carbohydrate content of at least 45% by cereal grain weight. When extruded in accordance with a method of making absorbent of the present invention, each one of the plurality of absorbent pellets produced has at least 1% of carbohydrate polymer clumping agent by uncoated pellet weight and preferably between 1% and 10% carbohydrate polymer clumping agent with at least some of the carbohydrate polymer clumping agent being liquid, e.g., water, soluble.

One such preferred admixture (after any water has been added, i.e. wet admixture) has a moisture content of no more than about 10% by total wet admixture weight and the extruder extrudes the plurality of pellets at an extrusion pressure of at least 600 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can be coated after extrusion with a smectite-containing coating that can be formed of bentonite.

Another preferred admixture (after any water has been added, i.e. wet admixture) producing extruded pellets having between 1% and 10% carbohydrate polymer binder clumping agent by pellet weight has a moisture content of no more than about 18% by total wet admixture weight and the extruder extrudes the plurality of pellets at an extrusion pressure of at least 800 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can be coated after extrusion with a smectite-containing coating that can be formed of bentonite.

Another preferred admixture (after any water has been added, i.e. wet admixture) producing extruded pellets having between 1% and 10% carbohydrate polymer binder clumping agent by pellet weight has a moisture content of no more than about 15% by total wet admixture weight and the extruder extrudes the plurality of pellets at an extrusion pressure of at least 900 pounds per square inch and at extrusion temperature of at least 140° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can be coated after extrusion with a smectite-containing coating that can be formed of bentonite.

In a preferred method of making granular absorbent, the extruder extrudes pellets having at least 1% of the carbohydrate polymer binder clumping agent by pellet weight at an extrusion pressure of between 900 pounds per square inch and 1,200 pounds per square inch and at an extrusion temperature of between 140° Celsius and 165° Celsius. Such a method produces pellets with at least some of the carbohydrate polymer binder clumping agent being liquid, e.g., water, soluble. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can be coated after extrusion with a smectite-containing coating that can be formed of bentonite.

In another preferred method of making granular absorbent, the extruder extrudes pellets at an extrusion pressure of between 900 pounds per square inch and 1,200 pounds per square inch and at an extrusion temperature of between 140° Celsius and 165° Celsius producing pellets each having at least some carbohydrate polymer binder clumping agent with at least some of the carbohydrate polymer binder clumping agent being water soluble and which can be formed of liquid, e.g., water, soluble dextrin. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each absorbent pellet can have a smectite-containing coating that can be formed of bentonite.

Such a preferred method of making the absorbent, the extruder extrudes pellets at an extrusion pressure of between 900 pounds per square inch and 1,200 pounds per square inch and at an extrusion temperature of between 140° Celsius and 165° Celsius causing starch dextrinization to occur during one of gelatinizing and extruding of the liquid absorbing pellets forming at least some dextrin in each extruded pellet. The admixture can be made of a dry admixture formed of at least 70% by dry admixture weight of at least one cereal grain having a high carbohydrate content of at least 65% by cereal grain weight and having a high starch content of at least 60% by cereal grain weight. Suitable sources of the cereal grain include at least of corn grits, corn meal, corn flour and corn starch and which can include a blend or mixture of more than one of corn grits, corn meal, corn flour and corn starch. One such method of making absorbent produces pellets each having at least 0.1% dextrin by weight. Another such method produces pellets each having at least 2% dextrin by weight. Still another such method produces pellets each having between 0.1% and 5% dextrin by weight. Another such method produces pellets each having between 2% and 10% dextrin by weight. Each pellet can have a smectite-containing coating that can be formed of bentonite.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Tenth Pellet Formulation and Method

A tenth preferred admixture for extruding pellets well suited for use as granular absorbent is rice-based and formed of the following constituents:

| Rice Meal | ≈100% |
| --- | --- |
| Total Mixture (before adding water) | 100% |
| Water (Liters per 100 lbs of Admixture) | 4.7-5.5/4.9-5.2 |

The rice meal can be coarsely ground or finely ground as known in the industry. The rice meal can be degermed rice meal or whole grain rice meal made of short grain rice, long grain rice, wild rice or another suitable type of rice. The rice meal used can be a mixture of commercially available degermed rice meal and whole grain rice meal. In still another preferred pellet embodiment and method of pellet making, the cornmeal is made of a mixture of degermed rice meal and whole grain rice meal whose weight percentages can be varied from any ratio between 100% degermed rice meal and 0% whole grain rice meal to 0% degermed rice meal and 100% whole grain rice meal. One preferred degermed—whole grain rice meal mixture has about 50% (±5%) degermed rice meal and about 50% (±5%) whole grain rice meal.

The rice meal has at least 70% carbohydrate content by rice meal weight and at least 60% starch by rice meal weight. Another preferred rice meal well suited for use in such a pellet formulation has at least 75% carbohydrate content by rice meal weight and at least 65% starch by rice meal weight. The rice meal has at least 55% amylopectin and an amylose:amylopectin ratio of between 10:90 and 45:55. Another preferred rice meal has at least 60% amylopectin and an amylose:amylopectin ratio of between 15:85 and 40:60. Another preferred rice meal has an amylose:amylopectin ratio of between 20:80 and 35:65.

In one pellet formulation and pellet making method, between 4.7 liters and 5.5 liters of water are added for every 100 pounds of the total mixture such that the wet admixture has a moisture content ranging between about 9.0% and about 11.0% and preferably between 9.4% and 10.8% of wet admixture weight. In another preferred pellet formulation and pellet making method, between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The rice meal is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, water or another liquid causing clumping of the pellet with adjacent pellets. Each pellet has a carbohydrate polymer binder content varying between 1% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that can cause adiabatic extrusion to occur dextrinizing starch during extrusion thereby forming dextrin in each extruded pellet. Where starch dextrinization occurs during extrusion, each pellet has a dextrin content varying between 1% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 800 pounds per square inch (psi) at the extruder head extruding the gelatinized admixture out an extrusion die having a die opening of between 0.03 inches and 0.1 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 800 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred where desired or needed in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based absorbents and water absorption of at least 80% of conventional absorbents. As a result, performance of coated pellets in accordance with the present invention is substantially the same as conventional clay-based absorbents but weighs less than half that of conventional absorbents for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Eleventh Pellet Formulation and Method

An eleventh preferred admixture for extruding pellets well suited for use as granular absorbent also is rice and corn based and is formed of the following constituents:

| | |
|---|---|
| Rice Meal | 40%-60% |
| Corn Starch | 5%-15% |
| Cellulosic Material | 10%-40% |
| Total Mixture (before adding water) | 100% |
| Water (Liters per 100 lbs of Admixture) | 2-3/2.4-2.6 |

The rice meal can be coarsely ground or finely ground as known in the industry. The rice meal can be degermed rice meal or whole grain rice meal made of short grain rice, long grain rice, wild rice or another suitable rice. The rice meal can be a mixture of commercially available degermed rice meal and commercially available whole grain rice meal. The corn starch preferably is a commercially available corn starch that is finely ground and which can be ground into a flour. If desired, between 0.1% and 0.3% glycerol monostearate (GMS) or another suitable surfactant can be added to the mixture either during blending of the rice meal with the corn starch and/or when blended with the cellulosic material.

The portion of the dry admixture formed by the rice meal and corn starch has at least 70% carbohydrate content by weight and at least 60% starch by weight. Another preferred dry admixture portion formed of the rice meal and corn starch well suited for use in such a pellet formulation has at least 75% carbohydrate content by weight and at least 65% starch by weight. The dry admixture portion formed of the rice meal and corn starch has at least 55% amylopectin and an amylose:amylopectin ratio of between 10:90 and 45:55. Another preferred dry admixture portion formed of the rice meal and corn starch has at least 60% amylopectin and an amylose:amylopectin ratio of between 15:85 and 40:60. Another preferred dry admixture portion formed of the rice meal and corn starch has an amylose:amylopectin ratio of between 20:80 and 35:65.

In one pellet formulation and pellet making method, between 2 liters and 3 liters of water are added for every 100 pounds of the total mixture such that the wet admixture has a moisture content ranging between about 4.0% and about 9.0% and preferably between 4.2% and 8.1% of wet admixture weight. In another preferred pellet formulation and pellet making method, between 2.4 liters and 2.6 liters of water are added for every 100 pounds of the total mixture such that the wet admixture has a moisture content ranging between about 4.8% and about 5.6% and preferably between 5% and 5.5% of wet admixture weight.

The rice meal and corn starch is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder. If desired, at least some water can be added during mixing or blending of the rice meal and corn starch before the blended rice meal/cornstarch mixture is mixed or blended with the cellulosic material.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, water or another liquid causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that can cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 600 pounds per square inch (psi) at the extruder head extruding the gelatinized admixture out an extrusion die having a die opening of between 0.01 inches and 0.05 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 600 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 600 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 600 psi and 1,200 psi. The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 2 millimeters and 4 millimeters and a length of between 2 and 4 millimeters were produced. These uncoated pellets have a bulk density no greater than 0.4 grams per cubic centimeter and preferably between 0.30 grams per cubic centimeter and 0.35 grams per cubic centimeter (preferably about 0.317 grams per cubic centimeter). These uncoated pellets have an ASTM oil absorbancy of at least 1.25 grams per gram and between 1.25 grams per gram and 1.80 grams per gram (preferably about 1.60 grams per gram). These uncoated pellets have an ASTM water absorbancy of at least 0.7 grams per gram and between 0.7 grams per gram and 0.9 grams per gram (preferably about 0.81 grams per gram). Such uncoated pellets have a sieve analysis of between 2%-3% retained by a #5 mesh, between 25%-30% retained by a #8 mesh, between 60%-75% retained by a #10 mesh, and no more than 3% retained by the pan.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, the round or generally cylindrical pellets have a width or diameter ranging between about 2.1 millimeters and 5 millimeters and a length of between 2.1 and 5 millimeters. The coated pellets have a bulk density no greater than 0.75 grams per cubic centimeter and preferably between 0.65 grams per cubic centimeter and 0.58 grams per cubic centimeter (preferably about 0.616 grams per cubic centimeter). The coated pellets have an ASTM oil absorbancy of at least 2.0 grams per gram and between 2.0 grams per gram and 2.75 grams per gram (preferably about 2.5 grams per gram). These coated pellets have an ASTM water absorbancy of at least 1.8 grams per gram and between 1.8 grams per gram and 2.25 grams per gram (preferably about 2.15 grams per gram). Such coated pellets have a sieve analysis of no more than 2% retained by a #5 mesh, between 45%-60% retained by a #8 mesh, between 40%-50% retained by a #10 mesh with less than 1% retained by the pan.

Coated pellets of such size advantageously have a size similar to that of conventional granular clay-based absorbents and water absorption of at least 70% of conventional absorbents. As a result, performance of coated pellets in accordance with the present invention is substantially the same as conventional clay-based absorbents but weighs less than half that of conventional absorbents for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold as granular absorbent.

Twelfth Pellet Formulation and Method

A twelfth preferred admixture for extruding pellets well suited for use as granular absorbent is corn-based and formed of the following constituents

| Corn Meal | 55%-75% |
| Corn Starch | 5%-15% |
| Cellulosic Material | 10%-30% |
| Total Mixture (before adding water) | 100% |
| Water (Liters per 100 lbs of Admixture) | 2-3/2.4-2.6 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. In one preferred pellet embodiment and method of pellet making, substantially all of the cornmeal is degermed yellow cornmeal that preferably is CCM 260 degermed yellow cornmeal. In another preferred pellet embodiment, substantially all of the cornmeal is degermed yellow cornmeal that preferably is YCM 260 whole grain yellow cornmeal. If desired, in certain instances, corn grits can be substituted for the corn meal. The corn starch preferably is a commercially available corn starch that is finely ground and which can be ground into a flour. If desired, between 0.1% and 0.3% glycerol monostearate (GMS) or another suitable surfactant can be added to the mixture either during blending of the rice meal with the corn starch and/or when blended with the cellulosic material.

In still another preferred pellet embodiment and method of pellet making, the cornmeal is made of a mixture of degermed yellow cornmeal, e.g. CCM 260, and whole grain yellow cornmeal, e.g., YCM 260, whose weight percentages can be varied from any ratio between 75% degermed yellow cornmeal and 25% whole grain yellow cornmeal to 25% degermed yellow cornmeal and 75% whole grain yellow cornmeal. One preferred degermed—whole grain cornmeal mixture has about 50% (±5%) degermed yellow cornmeal and about 50% (±5%) whole grain yellow cornmeal.

The portion of the admixture formed by the corn meal and corn starch has at least 70% carbohydrate content by weight and at least 60% starch by weight. Another preferred admixture portion formed of corn meal and corn starch well suited for use in such a pellet formulation has at least 75% carbohydrate content by weight and at least 65% starch by weight. The admixture portion formed of corn meal and corn starch has at least 55% amylopectin and an amylose:amylopectin ratio of between 10:90 and 45:55. Another preferred admixture portion formed of corn meal and corn starch has at least 60% amylopectin and an amylose:amylopectin ratio of between 15:85 and 40:60. Another preferred admixture portion formed of corn meal and corn starch has an amylose: amylopectin ratio of between 20:80 and 35:65.

In one pellet formulation and pellet making method, between 2 liters and 3 liters of water are added for every 100 pounds of the total mixture such that the wet admixture has a moisture content ranging between about 4.0% and about 9.0% and preferably between 4.2% and 8.1% of wet admixture weight. In another preferred pellet formulation and pellet making method, between 2.4 liters and 2.6 liters of water are added for every 100 pounds of the total mixture such that the wet admixture has a moisture content ranging between about 4.8% and about 5.6% and preferably between 5% and 5.5% of wet admixture weight.

The corn meal and corn starch is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder. If desired, at least some water can be added to the admixture portion formed of the corn meal and corn starch before blending the mixed corn meal and corn starch with the cellulosic material.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that can cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 600 pounds per square inch (psi) at the extruder head extruding the gelatinized admixture out an extrusion die having a die opening of between 0.01 inches and 0.05 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 600 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 600 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 600 psi and 1,200 psi. The use of an extruder with at least one compression screw or at least one screw having at least one compression section or zone is preferred where desired or needed in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 2 millimeters and 4 millimeters and a length of between 2 and 4 millimeters were produced. These uncoated pellets have a bulk density no greater than 0.4 grams per cubic centimeter and preferably between 0.30 grams per cubic centimeter and 0.35 grams per cubic centimeter (preferably about 0.317 grams per cubic centimeter). These uncoated pellets have an ASTM oil absorbancy of at least 1.25 grams per gram and between 1.25 grams per gram and 1.80 grams per gram (preferably about 1.60 grams per gram). These uncoated pellets have an ASTM water absorbancy of at least 0.7 grams per gram and between 0.7 grams per gram and 0.9 grams per gram (preferably about 0.81 grams per gram). Such uncoated pellets have a sieve analysis of between 2%-3% retained by a #5 mesh, between 25%-30% retained by a #8 mesh, between 60%-75% retained by a #10 mesh, and no more than 3% retained by the pan.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the ABSORBENT PELLET COATINGS AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the ABSORBENT PELLET COATINGS AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, the round or generally cylindrical pellets have a width or diameter ranging between about 2.1 millimeters and 5 millimeters and a length of between 2.1 and 5 millimeters. The coated pellets have a bulk density no greater than 0.75 grams per cubic centimeter and preferably between 0.65 grams per cubic centimeter and 0.58 grams per cubic centimeter (preferably about 0.616 grams per cubic centimeter). The coated pellets have an ASTM oil absorbancy of at least 2.0 grams per gram and between 2.0 grams per gram and 2.75 grams per gram (preferably about 2.5 grams per gram). These coated pellets have an ASTM water absorbancy of at least 1.8 grams per gram and between 1.8 grams per gram and 2.25 grams per gram (preferably about 2.15 grams per gram). Such coated pellets have a sieve analysis of no more than 2% retained by a #5 mesh, between 45%-60% retained by a #8 mesh, between 40%-50% retained by a #10 mesh with less than 1% retained by the pan.

Coated pellets of such size advantageously have a size similar to that of conventional granular clay-based absorbents and water absorption of at least 70% of conventional absorbents. As a result, performance of coated pellets in accordance with the present invention is at least as good as conventional clay-based absorbents but weighs less than half that of conventional absorbents for a given package volume or package size.

In one preferred embodiment, it is contemplated that uncoated pellets can also be packaged and sold for use as cat litter. In another preferred embodiment, the pellets are coated with a clay-based coating as discussed above before being packaged and sold.

Preferred Absorbent Pellet Formulations and Methods

In one preferred method of making an admixture well suited for making granular absorbents using extruded pellets of the present invention includes starch that is gelatinized in an extruder under sufficient pressure and temperature causing a clumping agent to form during pellet extrusion that includes a carbohydrate polymer binder formed of at least some of the starch in the admixture during extrusion from the extruder producing a plurality of extruded pellets having a bulk density no greater than 0.7 grams per cubic centimeter having carbohydrate polymer binder clumping agent that preferably is liquid, e.g., water, soluble. In one preferred method, at least part, if not all, of the carbohydrate polymer binder clumping agent includes or is formed of dextrin.

During operation of the extruder in carrying out the method of making absorbent, the admixture (after any water has been added) has a moisture content low enough and the extruder operates at an extrusion pressure and temperature high enough to dextrinize starch in the admixture during at least one of gelatinization and extrusion by the extruder forming dextrin in each pellet. In one preferred implementation of the method, the admixture (after any water has been added, i.e. wet admixture) has a moisture content of no more than 18% by total wet admixture weight and the extruder extrudes the plurality of pellets at an extrusion pressure of at least 800 pounds per square inch and at extrusion temperature of at least 135° Celsius. Under such extruder operating conditions, the extruder can operate under adiabatic extruder operating conditions during extruding the plurality of pellets.

One such method of making granular absorbent produces absorbent pellets each having at least 0.1% dextrin by weight. Another such method produces pellets each having at least 2% dextrin by weight. Still another such method produces pellets each having between 0.1% and 5% dextrin by weight. Another such method produces pellets each having between 2% and 10% dextrin by weight.

One preferred admixture well suited for use with a method of making of making granular absorbent has at least one cereal grain with a high carbohydrate content of at least 45% by cereal grain weight. Such an admixture can be formed of at least 70% by dry admixture weight of at least one cereal grain having a high carbohydrate content of at least 45% by cereal grain weight. When extruded in accordance with a method of making granular absorbent of the present invention, each one of the plurality of pellets produced has at least 1% of carbohydrate polymer clumping agent by uncoated pellet weight and preferably between 1% and 10% carbohydrate polymer clumping agent with at least some of the carbohydrate polymer clumping agent being water soluble.

One such preferred admixture (after any water has been added, i.e. wet admixture) has a moisture content of no more than about 10% by total wet admixture weight and the extruder extrudes the plurality of pellets at an extrusion pressure of at least 600 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can be coated after extrusion with a smectite-containing coating that can be formed of bentonite.

Another preferred admixture (after any water has been added, i.e. wet admixture) producing extruded pellets having between 1% and 10% carbohydrate polymer binder clumping agent by pellet weight has a moisture content of no more than about 18% by total wet admixture weight and the extruder extrudes the plurality of pellets at an extrusion pressure of at least 800 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can be coated after extrusion with a smectite-containing coating that can be formed of bentonite if desired.

Another preferred admixture (after any water has been added, i.e. wet admixture) producing extruded pellets having between 1% and 10% carbohydrate polymer binder clumping agent by pellet weight has a moisture content of no more than about 15% by total wet admixture weight and the extruder extrudes the plurality of pellets at an extrusion pressure of at least 900 pounds per square inch and at extrusion temperature of at least 140° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can be coated after extrusion with a smectite-containing coating that can be formed of bentonite if desired.

In a preferred method of making granular absorbent, the extruder extrudes pellets having at least 1% of the carbohydrate polymer binder clumping agent by pellet weight at an extrusion pressure of between 900 pounds per square inch and 1,200 pounds per square inch and at an extrusion temperature of between 140° Celsius and 165° Celsius. Such a method produces pellets with at least some of the carbohydrate polymer binder clumping agent being water soluble. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can be coated after extrusion with a smectite-containing coating that can be formed of bentonite.

In another preferred method of making the absorbent, the extruder extrudes pellets at an extrusion pressure of between 900 pounds per square inch and 1,200 pounds per square inch and at an extrusion temperature of between 140° Celsius and 165° Celsius producing pellets each having at least some carbohydrate polymer binder clumping agent with at least some of the carbohydrate polymer binder clumping agent being water soluble and which can be formed of water soluble dextrin. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each pellet can have a smectite-containing coating that can be formed of bentonite.

Such a preferred method of making the absorbent, the extruder extrudes pellets at an extrusion pressure of between 900 pounds per square inch and 1,200 pounds per square inch and at an extrusion temperature of between 140° Celsius and 165° Celsius causing starch dextrinization to occur during one of gelatinizing and extruding of the absorbent pellets forming at least some dextrin in each extruded pellet. The admixture can be made of a dry admixture formed of at least 70% by dry admixture weight of at least one cereal grain having a high carbohydrate content of at least 65% by cereal grain weight and having a high starch content of at least 60% by cereal grain weight. Suitable sources of the cereal grain include at least of corn grits, corn meal, corn flour and corn starch and which can include a blend or mixture of more than one of corn grits, corn meal, corn flour and corn starch. One such method of making absorbent produces pellets each having at least 0.1% dextrin by weight. Another such method produces pellets each having at least 2% dextrin by weight. Still another such method produces pellets each having between 0.1% and 5% dextrin by weight. Another such method produces pellets each having between 2% and 10% dextrin by weight. Each pellet can have a smectite-containing coating that can be formed of bentonite if desired.

The present invention is directed to an granular absorbent and method for making such a granular absorbent by extruding pellets made at least partially of an organic or plant material in a manner that produces liquid absorbent pellets using a single screw or twin screw extruder. In such a method, an admixture is prepared that includes starch that is introduced into the extruder operating at parameters sufficient to produce granular absorbent formed of a plurality of pairs, i.e., at least three, of pellets discharged from the extruder that are preferably each of void filled porous liquid absorbing construction. In a preferred method of making granular absorbent in accordance with the invention, the starch-containing admixture is extruded under extruder operating conditions at a sufficiently high enough pressure at the extruder head or die and at a sufficiently high temperature at the extruder head or die to form at least some liquid-soluble carbohydrate binder in each extruded pellet. The starch-containing admixture preferably is extruded under such extruder operating conditions that forms a sufficient amount of carbohydrate binder in each extruded pellet so that at least some of the carbohydrate binder dissolves into liquid being absorbed by the pellets of the granular absorbent helping not only to facilitate absorption but also helping clump the pellets together during absorption advantageously facilitating cleanup of the spent pellets once the liquid is absorbed.

A preferred admixture includes particle-size reduced starch-containing material that can be organic, such as plant based organic material, which has been processed including by being particle-size reduced, such as by grinding or using another type of comminution, into grits, meal, flour or starch. A preferred admixture includes plant based organic material in the form of one or more cereal grains that have been processed, including by being particle-size reduced, into grits, meal, flour or even starch. Preferred cereal grains well suited for use in making liquid absorbent pellets in accordance with the present invention include corn or maize, rice, wheat, triticale, amaranth, and/or sorghum.

A preferred cereal grain admixture formed of grits, meal, flour and/or starch of one or more of the above-identified cereal grains is mixed dry in a mixer or blender, such as a ribbon blender. Where water is needed or desired, water is added in an amount no greater than 5% by weight such that for a 50 pound batch of the aforementioned admixture, no more than one liter of water is added. In another preferred admixture, water is added in an amount no more than 3% by weight such that for a 50 pound batch of the aforementioned admixture, no more than 0.5 liters of water is added. Where water is added to the admixture, some or all of the water can be added during mixing of the admixture in the mixer with the remainder added to the admixture in the extruder.

A preferred admixture is formed of at least 75% by weight of one or more grits, meal, flour and/or starch of one or more of the aforementioned cereal grains with the remainder of the admixture formed of other constituents that can include one or more of a cellulose-containing material, such as hay, alfalfa, wood fiber, shredded paper or newspaper, beet pulp, and/or another cellulose-containing material. If desired, the admixture can be composed substantially completely of one or more grits, meal, flour and/or starch of one or more of the aforementioned cereal grains.

Such admixtures produced in accordance with the present invention can be formulated to have one or more of (a) a desired carbohydrate content by weight percentage, (b) a desired starch content by weight percentage, (c) a desired amylopectin content by weight percentage, (d) a desired amylopectin to amylose ratio, and/or (e) a desired amylose to amylopectin ratio as disclosed in more detail in the Appendix to this application as well as in Applicant's co-pending U.S. patent application Ser. No. 13/842,534 the entirety of each of which is hereby expressly incorporated herein.

Once the mixing step of mixing the aforementioned constituents of the admixture is completed forming the finished admixture, the finished admixture is transferred to an extruder that can be a single screw or twin screw extruder that preferably is a food or food-grader extruder as is known in the art. Such a food extruder is at least a 25 horsepower extruder and preferably is at least a 50 horsepower extruder capable of extruding at least 600 pounds of absorbent pellets per hour.

During operation, the extruder is operated at an admixture feed rate, extruder screw rotational speed, extruder head or die temperature, and extruder head or die pressure to extrude gelatinized admixture within the extruder through an extruder head or die having a desirably small aperture size producing a plurality of absorbent pellets having carbohydrate polymer binder formed in each pellet during extrusion. Depending on the admixture formulation, the moisture content of the admixture formulation, the feed rate, screw speed, extruder head or die temperature, number and size of extruder head or die apertures, and the like, the amount of carbohydrate binder formed in each extruded pellet can be controlled and adjusted to increase the amount of binder to achieve a desired amount. Some suitable extruder operating parameters, operating conditions, and the like that form carbohydrate binder in pellets extruded using an admixture formulated as disclosed above are disclosed in more detail herein.

The amount of carbohydrate binder formed in each pellet during extrusion is sufficient to enable at least some of the carbohydrate binder of a pellet wetted by a liquid to be dissolved and flow with the liquid in an around the pellet as well as preferably in and around one or more adjacent pellets. Extruding such absorbent pellets having enough carbohydrate binder to provide free binder that dissolves in liquid wetting the pellets produces self-clumping pellets that advantageously facilitate cleanup of the pellets after their job is done.

Preferably, extruded absorbent pellets of a granular absorbent produced in accordance with the present invention have at least 1% carbohydrate binder by pellet weight with at least some of the carbohydrate binder distributed along (and/or adjacent) at least part of an outer surface or skin of the pellet and which can even form part of the outer pellet surface or skin. As a result of binder being located so close to the outer pellet surface, such binder is nearly immediately available upon wetting of the pellet to be dissolved into and/or solubilize in liquid wetting the pellet during absorption of liquid by the pellet. Having binder at or close to the outer pellet surface thereby advantageously facilitates rapid clumping of the pellets as well as more complete pellet clumping. Suitable amounts of carbohydrate binder, including pellet weight percentages, e.g., uncoated pellet weight percentages, and/or weight percent ranges are also disclosed herein.

In at least one method of making absorbent pellets of a granular absorbent in accordance with the present invention, the extruder is operated at an admixture feed rate, extruder screw rotational speed, extruder head or die temperature, and extruder head or die pressure to extrude gelatinized admixture within the extruder through an extruder head or die having a desirably small aperture size producing a plurality of absorbent pellets having carbohydrate binder formed in each pellet during extrusion that is or includes at least some dextrin. Where dextrin is formed in each extruded pellet, at least 0.1% by pellet weight of dextrin is formed in each pellet with at least some of the dextrin formed during extrusion distributed along (and/or adjacent) at least part of an outer surface or skin of the pellet and which can even form part of the outer pellet surface or skin.

One preferred granular absorbent formulation well suited for use as pet or animal litter is formed of a plurality of pairs, i.e., at least three, of pellets extruded in accordance with the present invention utilizes an admixture formulated in accordance with that disclosed above and extruded by an extruder operating in accordance with that disclosed above producing absorptive pellets well suited for use in absorbing pet or animal urine as well as pet or animal fecal matter. The pellets can be extruded having a generally round, oblong and/or cylindrical shape possessing a relatively small size ranging from a width or diameter of between about 1.5 millimeters and 2.2 millimeters and a length of between 1.5 and 2.5 millimeters in one uncoated pellet embodiment and having a width or diameter of between about 2.5 millimeters and 3.5 millimeters and a length of between 3.0 and 3.9 millimeters in another uncoated pellet embodiment. Extruder die or head aperture sizes can be varied from between 0.1 to 0.01 inches to produce pellets in accordance with the present invention having a desired size. Other pellet sizes suitable for use as cat litter is disclosed herein.

Other pellet shapes can be extruded as well. In one preferred method of making granular absorbent in accordance with the present invention that is well suited for use as cat litter, the die or head of the extruder along with a rotary cutter that cuts extrudate extruded from the extruder into pellets can be configured and have its rotational speed controlled in a manner that cuts the pellets into shapes differing from round, oblong and cylindrical. In one preferred implementation of a method of extruding absorbent pellets, the extruder head/die and cutter are configured and/or operated in a manner that produces absorbent pellets that are generally disc-shaped, oval, scalloped, half-moon shaped or which have a different shape where pellet thickness is less than half of the pellet length. In one such preferred method implementation, absorbent pellets are extruded that are generally disc-shaped, oval, scalloped, half-moon shaped or which have a different shape where pellet thickness is less than 30% of pellet length. In another such preferred method implementation, absorbent pellets are extruded that are generally disc-shaped, oval, scalloped, half-moon shaped or which have a different shape where pellet thickness is less than 20% of pellet length.

Cat, pet or animal litter produced with such pellets having a narrowest or thinnest extent being less than half the pellets longest or lengthwise extent help direct urine, liquid fecal matter, water as well as any other liquid contacting the pellets generally horizontally helping to spread it out. By spreading out urine, liquid fecal matter, water as well as any other liquid contacting the pellets generally horizontally along the top surface of such pellets in a litter box, the liquid gets absorbed by pellets on the top surface and adjacent the top surface producing a clump of wetted pellets that is less than a couple of inches deep. This advantageously keeps urine, liquid fecal matter, water as well as any other liquid from pooling in the bottom of the litter box while producing a shallow clump that is easy for a person to scoop up when cleaning the litter box.

If desired, each pellet can be coated with a coating applied to each pellet in a coating step that includes an absorptive material, such as a smectite or another absorptive mineral. In one preferred granular absorbent, each pellet is coated during a coating step following the extrusion step with a coating that includes such an absorptive material that preferably is a smectite, such as clay, e.g., bentonite. When coated with such a coating, each pellet is coated during the coating step to produce an outer coating or shell having a thickness ranging between 20 microns and 2,500 microns and which can be as thick as 0.2 inches if desired.

In a preferred method of coating absorbent pellets produced in accordance with the present invention, at least 10 pounds of pellets are loaded into a rotary coater that can be a rotary cement mixer drum, a generally cylindrical rotary coating drum, a commercial agglomerator, a commercial plater, a generally cylindrical seasoning coater, or another piece of equipment well suited for applying a coating to such relatively small pellets. During the coating step, movement of the coater tumbles and/or agitates the pellets while a coating mixture is introduced into the coater.

If the pellets in the coater are not already sufficiently moist enough to have at least a slightly tacky outer pellet surface, a wetting substep is performed while the coater tumbles and/or agitates the pellets to wet the outer surface of at least a plurality of pairs, i.e., at least three, of the pellets enough to solubilize at least some of the wetted pellets' carbohydrate binder located at and along their outer surface to make the wetted outer pellet surface tacky. During and/or after such a wetting substep, a coating substep is performed where coating mixture introduced into the coater readily adheres to those pellets whose outer surface was previously made tacky during the wetting substep. Coating mixture is added during the coating substep until further added coating mixture is no longer readily adhering to pellets being tumbled and/or agitated in the coater.

If the pellets are not sufficiently coated with the coating mixture, another wetting substep is performed to tackify at least part of the outer surface of at least a plurality of pairs of pellets being tumbled and/or agitated in the coater. Thereafter, another coating substep is performed where additional coating mixture is added until enough adheres to the outer surface of the tacky pellets absorbing at least some of the solubilized binder into the coating while adhering the coating to the tacky pellet. When pellets are no longer tacky, the coating substep can be ceased and another wetting step performed. Alternating wetting and coating substeps preferably are performed until at least 80% and preferably at least 95% of all of the pellets being coated in the coater are coated with the coating mixture forming a coating substantially completely encapsulating the pellets that is at least as thick or greater than a minimum desired predetermined coating thickness.

To determine when to stop performing the wetting substep, a sensor, such as an optical sensor, infrared sensor, moisture sensor, humidity sensor or another type of sensor can be used to monitor one or more of pellet wetness, moisture content, surface moisture or another pellet characteristic while the pellets are being tumbled and/or agitated in the coater. Once a desired sensor reading is detected that is indicative of binder of at least a plurality of pairs of pellets being tumbled and/or agitated in the coater being solubilized tackifying at least part of the outer surface of the pellets, coating mixture is then added. In such a pellet coating method implementation, one or more such sensors are monitored until a sensor reading is detected that is indicative of nearly or even substantially all of the solubilized binder on the previously tacky pellets having been absorbed by coating mixture that has adhered to the previously tacky pellets. When such a sensor reading is detected indicative of the pellets no longer being sufficiently tacky to permit adherence of additional coating mixture, another wetting substep is performed. Using such a sensor arrangement, a plurality of wetting substeps and coating substeps are performed as needed until at last 75% and preferably at least 95% of the pellets being coated with the coating mixture achieve a desired predetermined minimum coating thickness.

In another implementation of a preferred method of coating pellets, the pellets can be visually monitored while water is sprayed into and/or misted onto pellets in the coater while the pellets are being tumbled and/or agitated by the coater. When visually detected to be moist enough, coating mixture can be added in a coating substep. When it becomes visually apparent coating mixture being added is not being readily adhered to pellets being tumbled and/or agitated in the coater, another wetting substep is performed. Such wetting and coating substeps are performed as needed until at least 75% and preferably at least 95% of the pellets in the coater are coated with a coating having a minimum predetermined coating thickness.

Such a method of coating where pellets being tumbled and/or agitated in a coater are wetted to solubilize pellet binder enables coating mixture to adhere to the outer surface of each pellet in a manner that intermixes binder with particles of the coating mixture. This not only more firmly binds the coating to the pellet, it also draws binder from each coated pellet into the coating layer making the binder substantially immediately available to dissolve in liquid being absorbed by the pellet during use. This not only causes dissolved binder to flow with liquid wetting the pellet along the pellet in between adjacent pellets facilitating pellet clumping, but it also enables liquid to be more readily be absorbed into the pellet as a result of liquid-conveying pathways or pores formed when the dissolved binder flows away from the pellet.

In one preferred coating mixture, the coating mixture is formed of powdered bentonite having a mesh size of about 20 mesh or greater (smaller) and preferably a mesh size of 50 mesh or greater (smaller). Such a powdered coating mixture produces sufficiently small powder particles or granules that enable each pellet coated by the coating mixture to be substantially completely coated therewith. By coating the pellets with a bentonite coating, pellet crush strength is increased while liquid absorbance of each pellet is also improved. While pellets made in accordance with the present invention coated with such a bentonite coating are well suited for general use as a granular absorbent, they are also particularly well suited for use as cat litter.

Where coated with a coating, a screening, sieving or classification step can be performed to screen coated pellets larger than desired to remove them from the granular absorbent. In a recovery step in one preferred method of making granular absorbent, the larger coated pellets that have been removed are ground up, such as by using a hammer mill, into smaller granules that are then mixed back with the rest of the coated pellets of the granular absorbent. Grinding the oversized coated pellets not only breaks them up, it also opens up pores and voids in the pellet itself improving absorption. Grinding the oversized pellets also produces pellet and coating fines that cling to other coated pellets of the granular absorbent thereby helping to more quickly absorb liquid contacting the absorbent keeping the liquid from flowing too deep into the absorbent.

In another preferred granular absorbent formulation that is particularly well suited for use as cat litter, absorbent mineral granules typically of the size used in cat litter are mixed with pellets of the granular absorbent forming a mixture containing at least a plurality of pairs of absorbent mineral granules intermixed with at least a plurality of pairs of the absorbent pellets. In a preferred formulation, at least about 2% (±1%) of the granular absorbent mixture by weight is formed of such absorbent mineral granules. In another preferred formulation, at least 5% of the granular absorbent mixture by weight is formed of such absorbent mineral granules. In still another preferred formulation, between about 2% (±1%) and about 10% (±1%) of one such preferred granular absorbent formulation is made of absorbent mineral granules intermixed with absorbent pellets that can be coated pellets and/or uncoated pellets.

In a further preferred granular absorbent formulation that is particularly well suited for use as cat litter, absorbent clay-containing granules typically of the size used in cat litter are mixed with pellets of the granular absorbent forming a mixture containing at least a plurality of pairs of clay-containing granules intermixed with at least a plurality of pairs of the absorbent pellets. In a preferred formulation, at least about 2% (±1%) of the granular absorbent mixture by weight is formed of such clay containing granules. In another preferred formulation, at least 5% of the granular absorbent mixture by weight is formed of such absorbent clay-containing granules. In still another preferred formulation, between about 2% (±1%) and about 10% (±1%) of one such preferred granular absorbent formulation is made of absorbent clay-containing granules intermixed with absorbent pellets that can be coated pellets and/or uncoated pellets.

In a still further preferred granular absorbent formulation that is particularly well suited for use as cat litter, absorbent bentonite-containing granules typically of the size used in cat litter are mixed with pellets of the granular absorbent forming a mixture containing at least a plurality of pairs of bentonite-containing granules intermixed with at least a plurality of pairs of the absorbent pellets. In a preferred formulation, at least about 2% (±1%) of the granular absorbent mixture by weight is formed of such absorbent bentonite-containing granules. In another preferred formulation, at least 5% of the granular absorbent mixture by weight is formed of such absorbent bentonite-containing granules mixed with the pellets. In still another preferred formulation, between about 2% (±1%) and about 10% (±1%) of one such preferred granular absorbent formulation is made of absorbent bentonite-containing granules intermixed with absorbent pellets that can be coated pellets and/or uncoated pellets.

In a still further preferred granular absorbent formulation that is particularly well suited for use as cat litter, absorbent bentonite granules are mixed with pellets of the granular absorbent forming a mixture containing at least a plurality of pairs of bentonite granules intermixed with at least a plurality of pairs of the absorbent pellets. In a preferred formulation, at least about 2% (±1%) of the granular absorbent mixture by weight is formed of such bentonite granules. In another preferred formulation, at least 5% of the granular absorbent mixture by weight is formed of such bentonite granules mixed with the pellets. In still another preferred formulation, between about 2% (±1%) and about 10% (±1%) of one such preferred granular absorbent formulation is made of bentonite granules intermixed with absorbent pellets that can be or otherwise include coated pellets and/or uncoated pellets. If desired, bentonite powder can also be included in such a granular absorbent formulation.

In one preferred admixture formulation, an admixture formed of at least one cereal grain is mixed with at least 2% sorghum and preferably at least 5% sorghum by dry admixture weight. The addition of sorghum meal, sorghum flour, sorghum grits and/or sorghum starch in such a minimum weight percentage not only advantageously forms extruded pellets that are desirably liquid absorbent but which produces pellets having tannins from the sorghum distributed within them helping to prevent bacterial growth when wetted. In addition, the starch type and content of sorghum helps increase the amount of carbohydrate binder produced during pellet extrusion thereby facilitating clumping whether the pellets are coated or uncoated.

In one preferred admixture formulation, at least 3% sorghum is added to an admixture having at least 50% corn by weight. If desired, the remainder of the admixture can be formed of corn but where the pellets are intended to be used uncoated as a granular absorbent, e.g., cat litter, an absorptive filler, preferably hay, such as alfalfa, can be added to the admixture in an amount ranging from about 5% to about 25% dry admixture weight percent. In another preferred admixture formulation, at least 5% sorghum is added to a corn-based admixture having at least 75% corn by weight. If desired, the remainder of the admixture can be formed of corn but where the pellets are intended to be used uncoated as a granular absorbent, e.g., cat litter, an absorptive filler, preferably hay, such as alfalfa, can be added to the admixture in an amount ranging from about 5% to about 15% dry admixture weight percent. In such preferred admixtures, the admixture contains no more than 50% sorghum and preferably contains no more than 30% sorghum. In one such sorghum-containing admixture, corn meal is used along with sorghum flour. Where the admixture includes a filler, the filler preferably is particle size reduced into powder form, flour form, meal form, or grits form. Where hay is used as filler, the hay can be ground such as by using a hammer mill or the like to a reduced size as described herein. Other fillers, such as wood fiber, paper, newsprint, ground beet, or another fibrous cellulose containing filler can also be included in such an admixture instead of as well as in addition to hay.

Such filler preferably is also particle size reduced, such as by grinding or the like, before being mixed to form the admixture.

In one preferred admixture formulation, at least 3% sorghum is added to an admixture having at least 50% rice by weight. If desired, the remainder of the admixture can be formed of rice but where the pellets are intended to be used uncoated as a granular absorbent, e.g., cat litter, an absorptive filler, preferably hay, such as alfalfa, can be added to the admixture in an amount ranging from about 5% to about 25% dry admixture weight percent. In another preferred admixture formulation, at least 5% sorghum is added to a rice-based admixture having at least 75% rice by weight. If desired, the remainder of the admixture can be formed of rice but where the pellets are intended to be used uncoated as a granular absorbent, e.g., cat litter, an absorptive filler, preferably hay, such as alfalfa, can be added to the admixture in an amount ranging from about 5% to about 15% dry admixture weight percent. In such preferred admixtures, the admixture contains no more than 50% sorghum and preferably contains no more than 30% sorghum. In one such sorghum-containing admixture, rice meal is used along with sorghum flour. Where the admixture includes a filler, the filler preferably is particle size reduced into powder form, flour form, meal form, or grits form. Where hay is used as filler, the hay can be ground such as by using a hammer mill or the like to a reduced size. As previously discussed, other fillers, such as wood fiber, paper, newsprint, ground beet, or another fibrous cellulose containing filler can also be included in such an admixture instead of as well as in addition to hay. Such filler preferably is also particle size reduced, such as by grinding or the like, before being mixed to form the admixture.

In a preferred admixture formulation, at least 2% bentonite by dry admixture weight is added to any of the admixture formulations disclosed herein. The addition of bentonite enables each aforementioned admixture to be made without adding any water during the mixing step and preferably also without adding any water during extrusion. One preferred ground bentonite suitable for use is formed of ground or powdered bentonite, e.g., bentonite powder, having a mesh size of about 20 mesh or greater (smaller) and preferably a mesh size of 50 mesh or greater (smaller).

In another preferred admixture formulation, at least about 2% (±1%) bentonite and no more than about 10% (±1%) bentonite by dry admixture weight is added to any of the admixture formulations disclosed herein. The addition of bentonite enables each aforementioned admixture to be made without adding any water during the mixing step and preferably also without adding any water during extrusion. One preferred ground bentonite suitable for use is formed of ground or powdered bentonite, e.g., bentonite powder, having a mesh size of about 20 mesh or greater (smaller) and preferably a mesh size of 50 mesh or greater (smaller).

In still another preferred admixture formulation, about 5% (±2%) bentonite is added (to any of the admixture formulations disclosed herein. The addition of bentonite enables each aforementioned admixture to be made without adding any water during the mixing step and preferably also without adding any water during extrusion. Where bentonite is added, it preferably is particle size reduced into a powder or flour form. One preferred ground bentonite suitable for use is formed of bentonite having a mesh size of about 20 mesh or greater (smaller) and preferably a mesh size of 50 mesh or greater (smaller).

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention

What is claimed is:

1. A method of making granular absorbent comprising gelatinizing an admixture comprised of starch in an extruder under sufficient pressure and temperature forming a clumping agent comprised of a carbohydrate polymer binder from at least some of the starch of the admixture during extrusion from the extruder producing a plurality of extruded liquid absorbing pellets having a bulk density no greater than 0.7 grams per cubic centimeter and comprised of a liquid soluble carbohydrate polymer binder clumping agent comprised of dextrin; and
   wherein the admixture has a moisture content low enough and the extruder operates at an extrusion pressure and temperature high enough to dextrinize starch in the admixture during at least one of gelatinization and extrusion by the extruder forming dextrin in each liquid absorbing pellet.

2. The method of making granular absorbent of claim 1 wherein each liquid absorbing pellet has between 1% and 10% liquid soluble carbohydrate polymer clumping agent by pellet weight.

3. The method of making granular absorbent of claim 2 wherein the liquid soluble carbohydrate polymer binder clumping agent is water soluble.

4. The method of making granular absorbent of claim 1 wherein each liquid absorbing pellet has at least 5% water soluble carbohydrate polymer binder clumping agent by pellet weight.

5. The method of making granular absorbent of claim 4 wherein the admixture has a moisture content of no more than 18% by total wet admixture weight and the extruder is a single screw extruder that extrudes the plurality of liquid absorbing pellets at an extrusion pressure of at least 800 pounds per square inch and at extrusion temperature of at least 135° Celsius.

6. The method of making granular absorbent of claim 5 wherein the extruder operates under adiabatic extruder operating conditions during extruding the plurality of liquid absorbing pellets.

7. The method of making granular absorbent of claim 4 wherein each one of the plurality of liquid absorbing pellets is comprised of at least 0.1% dextrin by pellet weight.

8. The method of making granular absorbent of claim 1 wherein each one of the plurality of liquid absorbing pellets is comprised of at least 2% dextrin by pellet weight.

9. The method of making granular absorbent of claim 1 wherein each one of the plurality of liquid absorbing pellets is comprised of between 0.1% and 5% dextrin by pellet weight.

10. The method of making granular absorbent of claim 1 wherein each one of the plurality of liquid absorbing pellets is comprised of between 2% and 10% dextrin by pellet weight.

11. The method of making granular absorbent of claim 1 wherein the admixture is comprised of at least one cereal grain having a high carbohydrate content of at least 45% by cereal grain weight.

12. The method of making granular absorbent of claim 11 wherein the admixture comprises a dry admixture formed of at least 70% by dry admixture weight of at least one cereal grain having a high carbohydrate content of at least 45% by cereal grain weight.

13. The method of making granular absorbent of claim 1, wherein each one of the plurality of liquid absorbing pellets is comprised of at least 1% of the carbohydrate polymer clumping agent by pellet weight.

14. A method of making granular absorbent comprising gelatinizing an admixture comprised of starch in an extruder under sufficient pressure and temperature forming a clumping agent comprised of a carbohydrate polymer binder from at least some of the starch of the admixture during extrusion from the extruder producing a plurality of extruded liquid absorbing pellets having a bulk density no greater than 0.7 grams per cubic centimeter and comprised of carbohydrate polymer binder clumping agent;
wherein the admixture is comprised of a dry admixture formed of at least 70% by dry admixture weight of at least one cereal grain having a high carbohydrate content of at least 45% by cereal grain weight; and
wherein each one of the plurality of liquid absorbing pellets is comprised of between 1% and 10% of the carbohydrate polymer binder clumping agent by pellet weight and wherein the carbohydrate polymer binder clumping agent is comprised of a water soluble carbohydrate polymer binder clumping agent.

15. The method of making granular absorbent of claim 14 wherein the admixture has a moisture content of no more than about 18% by total wet admixture weight and the extruder is a single screw extruder that extrudes the plurality of liquid absorbing pellets at an extrusion pressure of at least 800 pounds per square inch.

16. The method of making granular absorbent of claim 15 wherein the admixture comprises a dry admixture formed of at least 70% by dry admixture weight of at least one cereal grain having a high carbohydrate content of at least 65% by cereal grain weight and having a high starch content of at least 60% by cereal grain weight.

17. The method of making granular absorbent of claim 16 wherein the dry admixture is comprised of at least 70% corn by dry admixture weight.

18. The method of making granular absorbent of claim 17 wherein the corn is comprised of at least one of corn grits, corn meal, corn flour and corn starch.

19. The method of making granular absorbent of claim 18 wherein each liquid absorbing pellet is coated with an outer coating comprised of a smectite.

20. The method of making granular absorbent of claim 15 wherein the dry admixture is comprised of whole grain sorghum.

21. The method of making granular absorbent of claim 14 wherein the admixture has a moisture content of no more than 18% by total wet admixture weight and the extruder extrudes the plurality of liquid absorbing pellets at an extrusion pressure of at least 800 pounds per square inch and at extrusion temperature of at least 135° Celsius.

22. The method of making granular absorbent of claim 21 wherein the admixture comprises a dry admixture formed of at least 70% by dry admixture weight of at least one cereal grain having a high carbohydrate content of at least 65% by cereal grain weight and having a high starch content of at least 60% by cereal grain weight.

23. The method of making granular absorbent of claim 22 wherein the dry admixture is comprised of at least 70% corn by dry admixture weight.

24. The method of making granular absorbent of claim 23 wherein the corn is comprised of at least one of corn grits, corn meal, corn flour and corn starch.

25. The method of making granular absorbent of claim 24 wherein each liquid absorbing pellet is coated with an outer coating comprised of a smectite after extrusion.

26. The method of making granular absorbent of claim 24 wherein each liquid absorbing pellet has an outer coating comprised of bentonite.

27. The method of making granular absorbent of claim 1 wherein the extruder is a single screw extruder that extrudes the plurality of liquid absorbing pellets at an extrusion pressure of at least 900 pounds per square inch.

28. The method of making granular absorbent of claim 27 wherein the dry admixture is made of whole grain sorghum.

29. The method of making granular absorbent of claim 27 wherein the dry admixture is comprised of at least 70% corn by dry admixture weight.

30. The method of making granular absorbent of claim 29 wherein the corn is comprised of at least one of corn grits, corn meal, corn flour and corn starch.

31. The method of making granular absorbent of claim 30 wherein the liquid soluble carbohydrate polymer binder is comprised of at least 5% water soluble carbohydrate polymer binder clumping agent.

32. The method of making granular absorbent of claim 31 wherein each liquid absorbing pellet is coated with an outer coating comprised of a smectite after extrusion.

33. The method of making granular absorbent of claim 32 wherein each liquid absorbing pellet has an outer coating comprised of bentonite.

34. A method of making granular absorbent comprising gelatinizing an admixture comprised of starch in an extruder under sufficient pressure and temperature forming a water soluble clumping agent comprised of a carbohydrate polymer binder from at least some of the starch of the admixture during extrusion from the extruder producing a plurality of extruded liquid absorbing pellets having a bulk density no greater than 0.7 grams per cubic centimeter and comprised of water soluble carbohydrate polymer binder clumping agent;
wherein the extruder extrudes the plurality of liquid absorbing pellets at an extrusion pressure of between 900 pounds per square inch and 1,200 pounds per square inch and at an extrusion temperature of between 140° Celsius and 165° Celsius; and
wherein starch dextrinization occurs during one of gelatinizing and extruding of the plurality of liquid absorbing pellets from the extruder producing liquid absorbing pellets each comprised of dextrin.

35. The method of making granular absorbent of claim 34 wherein the admixture comprises a dry admixture formed of at least 70% by dry admixture weight of at least one cereal grain having a high carbohydrate content of at least 65% by cereal grain weight and having a high starch content of at least 60% by cereal grain weight.

36. The method of making granular absorbent of claim 35 wherein each one of the plurality of liquid absorbing pellets is comprised of at least 0.1% dextrin by weight.

37. The method of making granular absorbent of claim 35 wherein each one of the plurality of liquid absorbing pellets is comprised at least 2% dextrin by weight.

38. The method of making granular absorbent of claim 35 wherein each one of the plurality of liquid absorbing pellets is comprised of at least 5% water soluble carbohydrate polymer binder clumping agent by pellet weight.

39. The method of making granular absorbent of claim 35 wherein each one of the plurality of liquid absorbing pellets is comprised of between 1% and 10% water soluble carbohydrate polymer binder clumping agent by pellet weight.

40. The method of making granular absorbent of claim 35 wherein each liquid absorbing pellet is coated with an outer coating comprised of a smectite after extrusion.

41. The method of making granular absorbent of claim 35 wherein each liquid absorbing pellet has an outer coating comprised of bentonite.

42. The method of making granular absorbent of claim 35 wherein the at least one cereal grain is comprised of at least one of corn grits, corn meal, corn flour and corn starch.

* * * * *